US012393131B2

(12) United States Patent
Kenmoku et al.

(10) Patent No.: US 12,393,131 B2
(45) Date of Patent: Aug. 19, 2025

(54) TONER

(71) Applicant: CANON KABUSHIKI KAISHA, Tokyo (JP)

(72) Inventors: Takashi Kenmoku, Mishima (JP); Kenta Kamikura, Yokohama (JP); Yuzo Seino, Gotemba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 773 days.

(21) Appl. No.: 17/655,127

(22) Filed: Mar. 16, 2022

(65) Prior Publication Data

US 2022/0214629 A1 Jul. 7, 2022

Related U.S. Application Data

(63) Continuation of application No. 16/935,254, filed on Jul. 22, 2020, now Pat. No. 11,314,178.

(30) Foreign Application Priority Data

Jul. 25, 2019 (JP) ................................ 2019-137253

(51) Int. Cl.
*G03G 15/08* (2006.01)
*G03G 9/08* (2006.01)
(Continued)

(52) U.S. Cl.
CPC ......... *G03G 9/0823* (2013.01); *G03G 9/0819* (2013.01); *G03G 9/0825* (2013.01);
(Continued)

(58) Field of Classification Search
CPC .. G03G 9/0819; G03G 9/0823; G03G 9/0825; G03G 9/0827; G03G 9/08711;
(Continued)

(56) References Cited

U.S. PATENT DOCUMENTS 6,777,153 B2 8/2004 Yano
6,808,907 B2 10/2004 Honma
(Continued)

FOREIGN PATENT DOCUMENTS

CN 107305326 A 10/2017
EP 2 016 466 A1 1/2009
(Continued)

OTHER PUBLICATIONS

Chemical Handbook, Fundamentals, Revised 5th edition, The Chemical Society of Japan (2004) (table on the back of the front cover).

*Primary Examiner* — Hoang X Ngo
(74) *Attorney, Agent, or Firm* — VENABLE LLP

(57) ABSTRACT

A toner containing a toner particle, wherein, when a dielectric loss tangent measured at a frequency of 10 kHz in an impedance measurement on the toner in an environment having a temperature of 50° C. and a relative humidity of 50% RH is designated by tan δ50° C.(1), and a dielectric loss tangent measured at a frequency of 10 kHz in an impedance measurement on the toner in an environment having a temperature of 30° C. and a relative humidity of 50% RH after the impedance measurement on the toner in an environment having a temperature of 50° C. and a relative humidity of 50% RH is designated by tan δ30° C.(2), tan δ50° C.(1) is from 0.015 to 0.050, the relationship tan δ50° C.(1)>tan δ30° C.(2) is satisfied, and tan δ30° C.(2)/tan δ50° C.(1) is from 0.25 to 0.66.

7 Claims, 3 Drawing Sheets

(51) Int. Cl.
*G03G 9/087* (2006.01)
*G03G 9/097* (2006.01)
*G03G 21/18* (2006.01)

(52) U.S. Cl.
CPC ....... *G03G 9/0827* (2013.01); *G03G 9/08711* (2013.01); *G03G 9/08773* (2013.01); *G03G 9/09708* (2013.01); *G03G 15/0877* (2013.01); *G03G 21/1814* (2013.01)

(58) Field of Classification Search
CPC ........... G03G 9/08773; G03G 9/09708; G03G 15/0877; G03G 21/181
See application file for complete search history.

(56) References Cited

U.S. PATENT DOCUMENTS

| | | | |
|---|---|---|---|
| 6,908,721 | B2 | 6/2005 | Kenmoku |
| 6,911,520 | B2 | 6/2005 | Fukui |
| 7,045,321 | B2 | 5/2006 | Imamura |
| 7,393,912 | B2 | 7/2008 | Mihara |
| 7,399,568 | B2 | 7/2008 | Fukui |
| 7,408,017 | B2 | 8/2008 | Imamura |
| 7,452,960 | B2 | 11/2008 | Yano |
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,935,771 | B2 | 5/2011 | Fukui |
| 8,067,136 | B2 | 11/2011 | Yano |
| 8,093,342 | B2 | 1/2012 | Minami |
| 8,110,329 | B2 | 2/2012 | Tominaga |
| 8,178,271 | B2 | 5/2012 | Fukui |
| 8,383,312 | B2 | 2/2013 | Fujimoto |
| 8,574,801 | B2 | 11/2013 | Itabashi |
| 8,609,312 | B2 | 12/2013 | Itabashi |
| 8,828,633 | B2 | 9/2014 | Itabashi |
| 8,828,639 | B2 | 9/2014 | Kamikura |
| 9,029,056 | B2 | 5/2015 | Kenmoku |
| 9,098,002 | B2 | 8/2015 | Kenmoku |
| 9,098,003 | B2 | 8/2015 | Masumoto |
| 9,423,714 | B2 | 8/2016 | Kenmoku |
| 9,880,478 | B2 | 1/2018 | Shimano |
| 9,933,717 | B2 | 4/2018 | Fujisaki |
| 9,952,523 | B2 | 4/2018 | Shimano |
| 10,114,303 | B2 | 10/2018 | Katsura |
| 10,191,400 | B2 | 1/2019 | Fujisaki |
| 10,303,074 | B2 | 5/2019 | Yamawaki |
| 10,310,396 | B2 | 6/2019 | Kamikura |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,422 | B2 | 1/2020 | Yamawaki |
| 10,551,758 | B2 | 2/2020 | Tanaka |
| 10,635,010 | B2 | 4/2020 | Kamikura |
| 10,732,530 | B2 | 8/2020 | Matsui |
| 10,747,136 | B2 | 8/2020 | Kenmoku |
| 11,169,458 | B2 | 11/2021 | Toyoizumi |
| 11,175,600 | B2 | 11/2021 | Uchiyama |
| 11,256,187 | B2 | 2/2022 | Ogaki |
| 2004/0058264 | A1 | 3/2004 | Sugahara |
| 2005/0026065 | A1* | 2/2005 | Onuma ................ G03G 9/0817 430/108.1 |
| 2005/0260514 | A1 | 11/2005 | Mihara |
| 2006/0014095 | A1 | 1/2006 | Sugahara |
| 2006/0121379 | A1 | 6/2006 | Dojo |
| 2006/0194071 | A1 | 8/2006 | Yano |
| 2007/0072102 | A1 | 3/2007 | Dojo |
| 2010/0203443 | A1 | 8/2010 | Okita |
| 2012/0172562 | A1 | 7/2012 | Kenmoku |
| 2013/0065174 | A1 | 3/2013 | Itabashi |
| 2017/0285502 | A1* | 10/2017 | Fujisaki ............. G03G 9/08755 |
| 2017/0299972 | A1 | 10/2017 | Tanaka |
| 2019/0271926 | A1 | 9/2019 | Kamikura |
| 2019/0384197 | A1 | 12/2019 | Aoki |
| 2019/0384200 | A1 | 12/2019 | Kamikura |
| 2020/0356019 | A1 | 11/2020 | Matsui |
| 2021/0026264 | A1 | 1/2021 | Kamikura |
| 2021/0026265 | A1 | 1/2021 | Kamikura |

FOREIGN PATENT DOCUMENTS

| | | | |
|---|---|---|---|
| EP | 2 767 871 | A1 | 8/2014 |
| JP | 2005-3726 | A | 1/2005 |
| JP | 2005-148409 | A | 6/2005 |
| JP | 2009-53384 | A | 3/2009 |
| JP | 2017-181743 | A | 10/2017 |
| JP | 2018-124463 | A | 8/2018 |
| JP | 2019-53248 | A | 4/2019 |
| WO | 2005/043251 | A1 | 5/2005 |

* cited by examiner

TONER

This application is a continuation of U.S. application Ser. No. 16/935,254 filed Jul. 22, 2020, the content of which is incorporated by reference herein. Additionally, this application claims the benefit of Japanese Patent Application No. 2019-137253 filed Jul. 25, 2019, the content of which is also hereby incorporated by reference herein in its entirety.

BACKGROUND OF THE INVENTION

Field of the Invention

The present disclosure relates to a toner used in recording methods that utilize an electrophotographic method, electrostatic recording method, or a toner jet system recording method.

Description of the Related Art

The sectors that use electrophotographic-based image formation have become diversified in recent years from printers and copiers to commercial printing machines. This has been accompanied by continuing increases in the image quality required of electrophotography.

Within this context, faithful reproduction of the latent image is required of the toner. Precision control of toner charge is effective for providing faithful reproduction of the latent image. An inadequate control of toner charge results in defects such as, inter alia, fogging, in which low-charge toner is developed into non-image areas, and poor control, in which overcharged toner fuses to the toner carrying member, which are factors that prevent faithful reproduction of the latent image.

Triboelectric charging, in which charge is imparted to toner by rubbing between the toner and a carrier or charging member (collectively referred to in the following as a charging member), has to date been widely investigated as a toner charging process.

However, because rubbing between the charging member and toner may not occur in a uniform manner, triboelectric charging can produce overcharged toner and low-charge toner. This occurs because charging by triboelectric charging is produced only in those regions were the toner and charging member are in contact.

In addition, triboelectric charging is quite susceptible to influence by humidity, and the charge quantity can vary in a low-humidity environment and a high-humidity environment. Moreover, because triboelectric charging is very sensitive to toner flowability, the charge quantity may change when the flowability declines when the toner deteriorates due to, for example, long-term use.

Investigations of the injection charging process have been carried out in order to solve these problems with the triboelectric charging process. The injection charging process is a process in which the toner is charged by the injection of charge due to the potential difference between the toner and the charging member.

In this case, if conduction paths are present in the toner and toner-to-toner, the toner as a whole can be uniformly charged, rather than charging just those regions in contact with a charging member.

Moreover, since, when injection charging is present, the charge quantity can be freely controlled by changing the potential difference, the charge quantity required by a system can then be easily satisfied. Furthermore, since injection charging is resistant to the influence of humidity, environmentally-induced variations in the charge quantity can be suppressed.

However, a problem with the injection charging process is the difficulty in achieving coexistence between charge injection and charge retention. This occurs because the presence of conduction paths in the toner and toner-to-toner facilitates leakage of the injected charge, and as a consequence the charge injection capability and the charge retention capability reside in a trade-off relationship.

Japanese Patent Application Laid-open No. 2005-148409 discloses a toner for which the volume resistivity is reduced at high voltage, and discloses an injection charging process that uses this toner. A goal for the process described in this patent document is to abolish the trade-off between the charge injection capability and the charge retention capability by carrying out only a charge injection process on the toner at a high voltage where the volume resistivity of the toner is reduced.

Japanese Patent Application Laid-open No. 2017-181743 discloses a toner for which the frequency giving tan δmax<the frequency giving tan δmin where tan δmax is the maximum value and tan δmin is the minimum value of the dielectric loss tangent tan δ yielded by measurement in the frequency range from 1 kHz to 100 kHz in an environment having a temperature of 20° C. and a relative humidity of 50% RH.

Japanese Patent Application Laid-open No. 2018-124463 discloses a toner for which the volume resistivity at 25° C./50% RH according to the temperature change method is at least $1.0\times10^{14}$ Ω·cm and the volume resistivity at 67° C. according to the temperature change method is not more than $1.0\times10^{15}$ Ω·cm.

SUMMARY OF THE INVENTION

With regard to Japanese Patent Application Laid-open No. 2005-148409, precise control of the charge quantity has been problematic because discharge is facilitated due to the requirement for high voltage in the charge injection process in order to achieve injection charging by this process. It has thus been quite difficult to achieve coexistence between the charge injection capability and the charge retention capability in injection charging systems.

With the toner described in Japanese Patent Application Laid-open No. 2017-181743, the dielectric loss tangent tan δ of the toner is controlled through the colorant contained in the toner base particle and through the group 1 element cations, e.g., Na ion, K ion, and so forth, and the hydrogen ion contained in the binder resin. The objectives for doing this are to improve the rise in the charge quantity while securing low-temperature fixability and produce a high-quality image that exhibits little image density non-uniformity, even when image formation is carried out at high speeds and high print percentages.

However, coexistence between the charge injection capability and the charge retention capability in injection charging systems has been a problem with the toner.

An objective for the toner described in Japanese Patent Application Laid-open No. 2018-124463 is to provide, through a residual amount of an activator at the surface of the toner base particle, an excellent charging performance for the toner prior to fixing and the ability to suppress the appearance of electrostatic offset after fixing, even when a crystalline substance is incorporated in the toner base particle.

However, coexistence between the charge injection capability and the charge retention capability in injection charging systems has been a problem with the toner.

According to the preceding, a toner that achieves a high degree of coexistence in the injection charging process between the charge injection capability and the charge retention capability, has not yet been obtained and further improvements are required.

The present disclosure provides a toner that enables precise charging control and has the ability to achieve a high image quality, by providing a high degree of coexistence in the injection charging process between the charge injection capability and charge retention capability.

The present disclosure relates to a toner containing a toner particle, wherein, when a dielectric loss tangent measured at a frequency of 10 kHz in an impedance measurement on the toner in an environment having a temperature of 50° C. and a relative humidity of 50% RH is designated by tan δ50° C.(1), and a dielectric loss tangent measured at a frequency of 10 kHz in an impedance measurement on the toner in an environment having a temperature of 30° C. and a relative humidity of 50% RH after the impedance measurement on the toner in an environment having a temperature of 50° C. and a relative humidity of 50% RH is designated by tan δ30° C.(2), tan δ50° C.(1) is from 0.015 to 0.050, tan δ50° C.(1) and tan δ30° C.(2) satisfy the relationship tan δ50° C.(1)>tan δ30° C.(2), and a ratio of tan δ30° C.(2) to tan δ50° C.(1) is from 0.25 to 0.66.

The present disclosure can thus provide a toner that enables precise charging control and has the ability to achieve a high image quality, by providing a high degree of coexistence in the injection charging process between the charge injection capability and charge retention capability.

Further features of the present invention will become apparent from the following description of exemplary embodiments with reference to the attached drawing.

DESCRIPTION OF THE EMBODIMENTS

Figure 1:
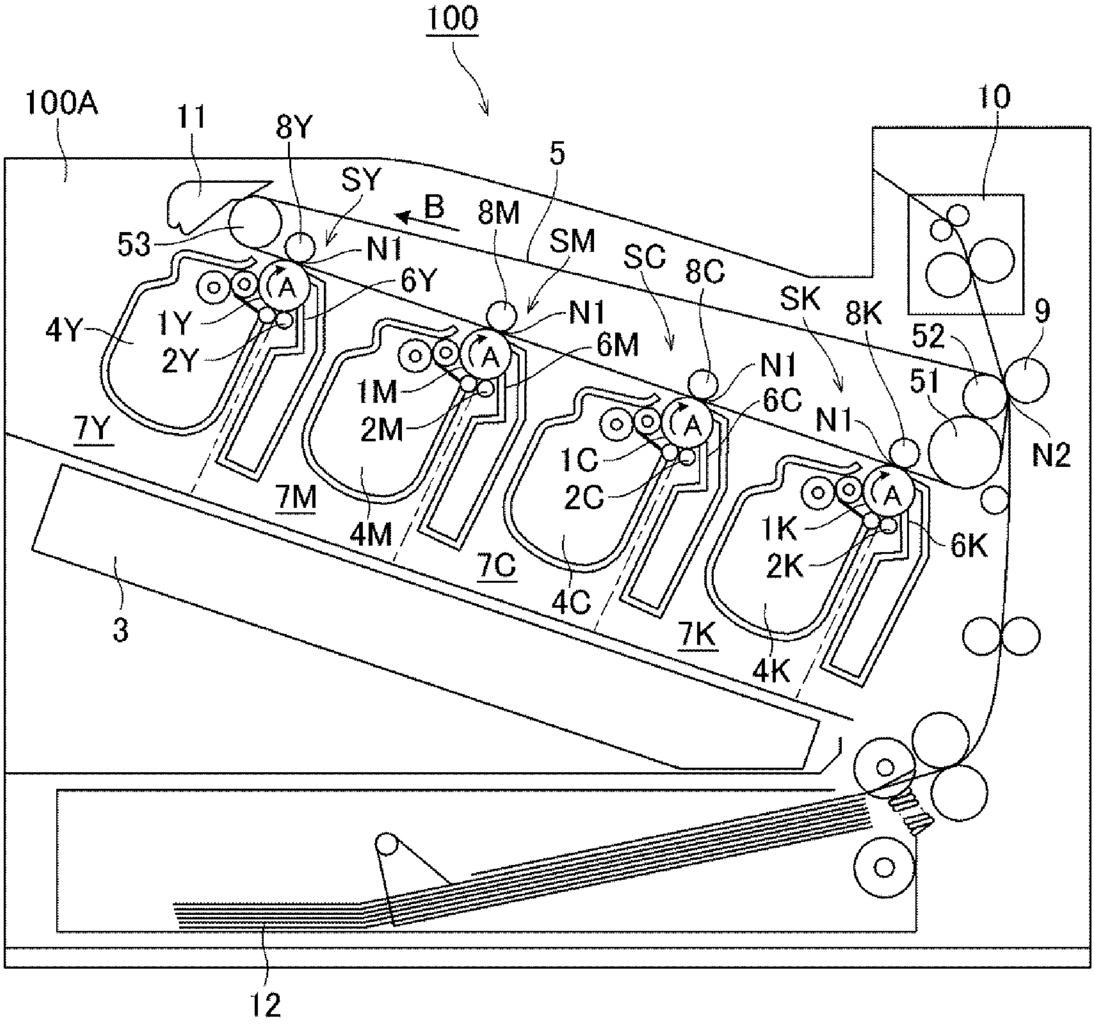
FIG. 1 contains an example of a cross-sectional diagram of an image-forming apparatus.

Unless otherwise specified, descriptions of numerical ranges such as "from XX to YY" or "XX to YY" in the present invention include the numbers at the upper and lower limits of the range.

The present disclosure relates to a toner containing a toner particle, wherein, when a dielectric loss tangent measured at a frequency of 10 kHz in an impedance measurement on the toner in an environment having a temperature of 50° C. and a relative humidity of 50% RH is designated by tan δ50° C.(1), and a dielectric loss tangent measured at a frequency of 10 kHz in an impedance measurement on the toner in an environment having a temperature of 30° C. and a relative humidity of 50% RH after the impedance measurement on the toner in an environment having a temperature of 50° C. and a relative humidity of 50% RH is designated by tan δ30° C.(2), tan δ50° C.(1) is from 0.015 to 0.050, tan δ50° C.(1) and tan δ30° C.(2) satisfy the relationship tan δ50° C.(1)>tan δ30° C.(2), and a ratio of tan δ30° C.(2) to tan δ50° C.(1) is from 0.25 to 0.66.

The factors that enable a high degree of coexistence between the charge injection capability and the charge retention capability in the injection charging process with the toner are unclear, but the present inventors hypothesize the following.

In order to complete the present invention, the present inventors focused on the controlling process for controlling the toner layer. A common image-forming process has a developing process that develops the toner from the toner carrying member to the image bearing member using the charge retained by the toner. A controlling process is present prior to this developing process: in this controlling process, the toner on the toner carrying member is controlled, using a controlling member such as a regulating blade, between the toner carrying member and the controlling member to form the toner layer on the toner carrying member. Since the toner must be charged in the developing process, an injection charging process must be carried out prior to the developing process, i.e., in the neighborhood of the controlling process.

At this point, the toner receives heat, to a degree that the toner does not melt, due to control between the toner carrying member and the controlling member. In response to the heat input during this control, the dielectric loss tangent tan δ of the toner assumes a larger value and charge can be injected into the toner in the controlling process. In addition, the temperature of the toner declines after control and the dielectric loss tangent tan δ of the toner assumes a smaller value, and due to this the toner assumes an excellent charge retention capability during development and transfer.

The toner is a toner containing a toner particle, wherein:

(A) Upon heating from 30° C. to 50° C., the toner particle undergoes an elastic microdeformation, which increases the contact points between toner particles. This increase in contact points between toner particles brings about an increase in the conduction paths between toner particles. The dielectric loss tangent tan δ of the toner is increased due to this increase in conduction paths and an excellent charge injection capability is established.

(B) Upon cooling from 50° C. to 30° C., the toner particle returns to the toner particle state prior to heating to 50° C. This results in a decline in contact points between toner particles and a decline in conduction paths between toner particles. As a result, the dielectric loss tangent tan δ of the toner declines and an excellent charge retention capability is established.

The following were found upon intensive investigations into the coexistence of this (A) and (B).

The electrical characteristic that indicates the charge injection capability and the charge retention capability in the injection charging process can be expressed for the toner by the dielectric loss tangent tan δ obtained by measurement at a frequency of 10 kHz.

The dielectric loss tangent tan δ is calculated using ε"/ε', where ε' is defined as the electrical energy storage capacity and ε" is defined as the electrical energy loss. The conductivity is also an index for properties that indicate the electrical characteristics of materials.

Generally, the conductivity at high frequencies of 1 kHz to 100 kHz represents charge transfer in the bulk, while the conductivity at low frequencies of around 0.01 kHz represents charge transfer at interfaces.

When, as with the toner, the electrical characteristics of the toner are controlled by causing a change in the contact points between toner particles through an elastic microdeformation of the toner particle upon heating and cooling, the effect of causing an elastic microdeformation of the toner particle (a bulk effect), and not only the toner particle interface, also affects the electrical properties.

Due to this, the electrical characteristics at high frequencies of 1 kHz to 100 kHz become dominant.

It is thought that in this high frequency range, the dielectric loss tangent tan δ rather than the conductivity is the property value that more accurately expresses the charge injection capability and the charge retention capability.

In an impedance measurement in an environment having a temperature of 50° C. and a relative humidity of 50% RH, the dielectric loss tangent tan δ50° C.(1) of the toner measured at a frequency of 10 kHz is from 0.015 to 0.050. In addition, this dielectric loss tangent tan δ50° C.(1) is preferably from 0.018 to 0.045 and is more preferably from 0.025 to 0.040.

The charge injection capability and charge retention capability are excellent when the dielectric loss tangent tan δ50° C.(1) is in the indicated range.

When the dielectric loss tangent tan δ50° C.(1) exceeds 0.050, the charge retention capability of the toner on the toner carrying member declines and toner scattering and fogging are produced.

The charge injection capability declines when, on the other hand, tan δ50° C.(1) is less than 0.015.

When the dielectric loss tangent of the toner measured at a frequency of 10 kHz in an impedance measurement on the toner in an environment having a temperature of 30° C. and a relative humidity of 50% RH after the impedance measurement on the toner in an environment having a temperature of 50° C. and a relative humidity of 50% RH is designated by tan δ30° C.(2), tan δ50° C.(1) and tan δ30° C.(2) satisfy the relationship tan δ50° C.(1)>tan δ30° C.(2), and the ratio of tan δ30° C.(2) to tan δ50° C.(1) is from 0.25 to 0.66.

By having tan δ50° C.(1) and tan δ30° C.(2) satisfy the aforementioned relationship and by adjusting the ratio of tan δ30° C.(2) to tan δ50° C.(1) [tan δ30° C.(2)/tan δ50° C.(1)] into the indicated range, the dielectric loss tangent tan δ of the toner is reduced after the controlling process due to the temperature decline of the toner. As a result, the toner exhibits an excellent charge retention capability during development and transfer.

When this [tan δ30° C.(2)/tan δ50° C.(1)] exceeds 0.66, the charge retention capability of the toner is reduced during development and transfer and toner scattering and fogging are produced.

When, on the other hand, this ratio is less than 0.25, the toner has a small dielectric loss tangent tan δ during development and transfer and toner-to-toner charge transfer is slow. As a result, fogging is produced during development and image defects are produced due to image nonuniformity due to transfer defects.

This [tan δ30° C.(2)/tan δ50° C.(1)] is preferably from 0.30 to 0.50.

When the dielectric loss tangent measured at a frequency of 10 kHz in an impedance measurement on the toner in an environment having a temperature of 30° C. and a relative humidity of 50% RH is designated by tan δ30° C.(1), the ratio of tan δ30° C.(1) to tan δ30° C.(2) [tan δ30° C.(1)/tan δ30° C.(2)] is preferably from 0.80 to 1.20 and is more preferably from 0.90 to 1.10.

By having the ratio [tan δ30° C.(1)/tan δ30° C.(2)] be in the indicated range, in addition to the previously described effects the production of fogging during development can be further suppressed.

The ratio [tan δ30° C.(1)/tan δ30° C.(2)] can be adjusted by controlling, for example, the dielectric loss tangent tan δ50° C.(1), the temperature Ta when G' is $1.0\times10^5$ Pa in dynamic viscoelastic measurement of the toner, vide infra, and the glass transition temperature Tg in differential scanning calorimetric measurement of the toner.

The mechanism for suppressing fogging during development is unclear, but the following is thought.

The toner in the developing apparatus receives heat, to a degree that the toner does not melt, due to control between the toner carrying member and the controlling member. In response to the heat input during this control, the dielectric loss tangent tan δ of the toner assumes a larger value and charge can be injected into the toner in the controlling process. In addition, the temperature of the toner declines after control and the dielectric loss tangent tan δ assumes a smaller value, and due to this the toner assumes an excellent charge retention capability during development and transfer.

On the other hand, toner that has not participated in development, for example, is stripped from the toner carrying member by, e.g., the toner feed roller that functions as a feed member that feeds toner, and is recovered to the toner holder.

A mixed condition is established within the toner holder between the toner that has not participated in development and toner prior to being fed to the toner carrying member. When the ratio [tan δ30° C.(1)/tan δ30° C.(2)] is in the indicated range, this facilitates the generation of a small difference in the charge injection capability, and in the charge retention capability, between the toner prior to feed to the toner carrying member and the toner that has been fed to the toner carrying member and then has not participated in development and has been recovered. There is then, as a result, little difference in the charging performance within the toner and the generation of fogging during development can be further suppressed. In addition, the change in the charge quantity pre-versus-post-durability testing can be made small.

The average circularity of the toner is preferably from 0.950 to 0.995, more preferably from 0.950 to 0.990, and still more preferably from 0.970 to 0.995.

When the average circularity of the toner satisfies the indicated range, this means that the toner shape is uniform and the formation of toner-to-toner conduction paths then becomes uniform and the assumption of a uniform charge quantity distribution is facilitated. The average circularity of the toner can be controlled by adjusting the production conditions.

The dielectric constant, as measured at a frequency of 10 kHz in an impedance measurement on the toner in an environment having a temperature of 30° C. and a relative humidity of 50% RH after an impedance measurement on the toner in an environment having a temperature of 50° C. and a relative humidity of 50% RH, is preferably from 1.2 to 4.0. It is more preferably from 1.5 to 2.5. The dielectric constant of the toner can be controlled using the constituent materials in the toner particle and using the constituent materials for the toner particle surface.

The dielectric constant can be measured using the same method as the method described below for measuring the dielectric loss tangent tan δ of the toner.

The architecture of the toner is described in detail in the following, but this should not be understood as a limitation thereby or thereto.

A plurality of examples are provided of embodiments of toners that can achieve the numerical value ranges or relationships described above for the dielectric loss tangent under the respective temperatures and humidities, but this should not be understood as a limitation thereby or thereto.

In a first embodiment, the toner includes, on the surface of the toner particle, fine particles B1 and fine particles A that contain a metal element-containing compound, the fine particles B1 have a number-average particle diameter DB of from 50 nm to 500 nm, a percentage occurrence of the metal element in measurement of the toner surface using X-ray photoelectron spectroscopy is from 5.0 atomic % to 10.0 atomic %, and when a temperature at which G' is $1.0 \times 10^5$ Pa in dynamic viscoelastic measurement of the toner is designated by Ta, and a glass transition temperature of the toner according to differential scanning calorimetric measurement is designated by Tg, Tg is from 40° C. to 70° C., and Ta is from 60° C. to 90° C.

In a second embodiment, in a toner including a toner particle, the toner particle includes a toner base particle and protruded portions B2 at the surface of the toner base particle, and at the toner particle surface, fine particles A that contain a metal element-containing compound, the protruded portions B2 have a number-average value of a protrusion height H of from 50 nm to 500 nm, a percentage occurrence of the metal element in measurement of the toner surface using X-ray photoelectron spectroscopy is from 5.0 atomic % to 10.0 atomic %, and when a temperature at which G' is $1.0 \times 10^5$ Pa in dynamic viscoelastic measurement of the toner is designated by Ta, and a glass transition temperature of the toner according to differential scanning calorimetric measurement is designated by Tg, Tg is from 40° C. to 70° C., and Ta is from 60° C. to 90° C.

In a third embodiment, in a toner including a toner particle, the toner particle includes a toner base particle and protruded portions B2 at the surface of the toner base particle, and at the toner particle surface, fine particles A that contain a metal element-containing compound, the protruded portions B2 have a number-average value of a protrusion height H of from 50 nm to 500 nm, the protruded portions B2 include the fine particles A that contain a metal element-containing compound and the fine particles A that contain a metal element-containing compound are present at the surface of the protruded portions B2, a percentage occurrence of the metal element in measurement of the toner surface using X-ray photoelectron spectroscopy is from 3.0 atomic % to 10.0 atomic %, and when a temperature at which G' is $1.0 \times 10^5$ Pa in dynamic viscoelastic measurement of the toner is designated by Ta, and a glass transition temperature of the toner according to differential scanning calorimetric measurement is designated by Tg, Tg is from 40° C. to 70° C., and Ta is from 60° C. to 90° C.

When the temperature at which G' is $1.0 \times 10^5$ Pa in dynamic viscoelastic measurement of the toner is designated by Ta, and the glass transition temperature of the toner according to differential scanning calorimetric measurement is designated by Tg, Tg is preferably from 40° C. to 70° C. and Ta is preferably from 60° C. to 90° C.

Tg is the glass transition temperature according to measurement by differential scanning calorimetry (DSC), and the toner exhibits a large elastic deformation at above Tg. When Tg is from 40° C. to 70° C., an excellent elastic deformation is displayed while heat resistance is maintained.

When Tg is at least 40° C., the toner undergoes elastic deformation upon heating in the controlling process and then, after the controlling process, the deformed toner also readily returns to its original condition upon cooling. As a result, [tan δ30° C.(2)/tan δ50° C.(1)] then readily satisfies the numerical value range indicated above.

When, on the other hand, Tg is not greater than 70° C., elastic deformation can occur and the relationship tan δ50° C.(1)>tan δ30° C.(2) is readily satisfied. This Tg is more preferably from 50° C. to 60° C.

Ta is the temperature at which G' is $1.0 \times 10^5$ Pa in dynamic viscoelastic measurement of the toner. When this Ta is from 60° C. to 90° C., an excellent elastic deformation is displayed while heat resistance is maintained.

When Ta is at least 60° C., the toner undergoes elastic deformation upon heating in the controlling process and then, after the controlling process, the deformed toner also readily returns to its original condition upon cooling. As a result, [tan δ30° C.(2)/tan δ50° C.(1)] then readily satisfies the numerical value range indicated above.

When, on the other hand, Ta is not greater than 90° C., the relationship tan δ50° C.(1)>tan δ30° C.(2) is readily satisfied. This Ta is more preferably from 60° C. to 80° C.

The Tg of the toner can be adjusted into the aforementioned range through control of the Tg of the binder resin that constitutes the toner. For example, when the binder resin is a styrene-acrylic resin, the ratios for the individual monomers, the degree of polymerization, and so forth can be varied.

The Ta of the toner, on the other hand, can be controlled by changing the degree of polymerization and Tg of the binder resin that constitutes the toner. It can also be controlled through the use of a compound that exhibits a plasticizing activity on the binder resin (a plasticizer). In this case, the compound exhibiting a plasticizing activity (plasticizer) is preferably a compound having a molecular weight of not more than 1,500.

As described in the preceding, preferably a material that can form conduction paths is disposed at the toner particle surface in the toner having a toner particle.

An example of this material is fine particles A that contain a metal element-containing compound (also referred to in the following simply as the metal compound fine particles A).

In addition, having the metal compound fine particles A at the toner particle surface facilitates control of the tan δ50° C.(1) and tan δ30° C.(2). Controlling the relationship between tan δ50° C.(1) and tan δ30° C.(2) and the ratio of tan δ30° C.(2) to tan δ50° C.(1) into the aforementioned ranges is readily achieved as a result.

In the first and second embodiments described above, the percentage occurrence of the metal element, in accordance with measurement of the toner surface using X-ray photoelectron spectroscopy, is preferably from 5.0 atomic % to 10.0 atomic % and is more preferably from 5.0 atomic % to 8.0 atomic %.

In the third embodiment described above, the aforementioned percentage occurrence of the metal element is preferably from 3.0 atomic % to 10.0 atomic % and is more preferably from 3.0 atomic % to 8.0 atomic %.

Conduction paths are formed in a more stable manner in the third embodiment described above because the metal compound fine particle A is fixed to the protruded portion B2. This facilitates the generation of preferred characteristics even at percentage occurrences of the metal element that are smaller than in the first and second embodiments.

The formation of a network structure between toner particles by the metal compound fine particle A is facilitated when the percentage occurrence of the metal element is in the indicated range. In addition, this network structure is altered by pressure, which facilitates the generation of pressure-induced changes in the dielectric loss tangents.

The number-average particle diameter DA of the fine particles A that contain a metal element-containing compound is preferably from 1 nm to 45 nm and is more preferably from 3 nm to 40 nm.

When the value of DA is in the indicated range, this facilitates the formation of conduction paths originating with a network between metal compound fine particles A present on the toner particle surface, and the charge injection capability is then further increased.

The content of the metal compound fine particle A is preferably adjusted, depending on the number-average particle diameter DA (unit for DA: nm) of the metal compound fine particle A, such that the percentage occurrence of the metal element in measurement of the toner surface using X-ray photoelectron spectroscopy satisfies the numerical value range indicated above.

The percentage occurrence of the metal element is readily controlled into the indicated numerical value range using the fact that a smaller number-average particle diameter DA provides a smaller content and the fact that a larger number-average particle diameter DA provides a larger content.

More specifically, the content of the metal compound fine particle A in the toner is preferably from 0.01 mass % to 10.0 mass %.

The volume resistivity of the metal compound fine particle A is preferably from $1.0\times10^2$ (Ω·m) to $1.0\times10^9$ (Ω·m) and is more preferably from $1.0\times10^3$ (Ω·m) to $1.0\times10^9$ (Ω·m).

Control of the dielectric loss tangents tan δ50° C.(1) and tan δ30° C.(2) of the toner is facilitated by having this volume resistivity be in the indicated range.

The volume resistivity can be measured by sandwiching a sample with electrodes, establishing a condition in which a certain load is applied using a torque wrench, and measuring the resistance and the distance between the electrodes. A detailed measurement method is described below.

Heretofore known metal compounds can be used without particular limitation as the metal compound constituting the fine particle A that contains a metal element-containing compound.

Specific examples are metal oxides, for which representative examples are titanium oxide, aluminum oxide, tin oxide, and zinc oxide; composite oxides, for which representative examples are strontium titanate and barium titanate; and polyhydric acid metal salts, for which representative examples are titanium phosphate, zirconium phosphate, and calcium phosphate.

Among the preceding, metal oxides and polyhydric acid metal salts are preferred from the standpoints of structural stability and volume resistivity. In addition, polyhydric acid metal salts are more preferred because they have a suitably polar structure, which facilitates the production of induced charge due to potential difference, and because they enable a more efficient injection charging by supporting a smooth charge transfer through a network structure in the molecule.

The heretofore known metal elements can be used without particular limitation as the instant metal element.

Among the preceding, at least one metal element selected from the group consisting of the metal elements in group 3 to group 13 is preferably contained. Metal compounds containing a metal element from group 3 to group 13 tend to have low water absorptivities, and as a consequence provide a more reduced humidity dependence for the charge injection capability and charge retention capability and can further enhance the stability with respect to the use environment.

The Pauling electronegativity of this metal element is preferably from 1.25 to 1.80 and is more preferably from 1.30 to 1.70. When the Pauling electronegativity of the metal element is in the indicated range, a suitable polarization is produced in the metal and non-metal moieties in the metal compound and a more efficient injection charging is made possible.

The values provided in "Chemical Handbook, Fundamentals", revised 5th edition, edited by The Chemical Society of Japan (2004) (Maruzen Publishing), table on the back of the front cover, were used for the Pauling electronegativity.

The metal element can be specifically exemplified by titanium (group 4, electronegativity: 1.54), zirconium (group 4, 1.33), aluminum (group 13, 1.61), zinc (group 12, 1.65), indium (group 13, 1.78), and hafnium (group 4, 1.30).

Among the preceding, the use is preferred of a metal that can have a valence of at least 3, with at least one selection from the group consisting of titanium, zirconium, and aluminum being more preferred and titanium being even more preferred.

The aforementioned metal elements can preferably be used as the metal element when a polyhydric acid metal salt is used as the metal compound. In addition, heretofore known polyhydric acids can be used without particular limitation as the polyhydric acid.

The polyhydric acid preferably contains an inorganic acid. Inorganic acids have a more rigid molecular skeleton than organic acids and as a consequence they undergo little change in properties during long-term storage. An injection charging capability can thus be obtained in a stable manner even after long-term storage.

The polyhydric acid can be specifically exemplified by inorganic acids, e.g., phosphoric acid (tribasic), carbonic acid (dibasic), and sulfuric acid (dibasic), and by organic acids such as dicarboxylic acids (dibasic) and tricarboxylic acids (tribasic).

The organic acids can be specifically exemplified by dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid, and terephthalic acid, and by tricarboxylic acids such as citric acid, aconitic acid, and trimellitic anhydride.

Among the preceding, at least one selection from the group consisting of phosphoric acid, carbonic acid, and sulfuric acid, which are inorganic acids, is preferred with phosphoric acid being particularly preferred.

Polyhydric acid metal salts that are combinations of the aforementioned metal elements and polyhydric acids can be specifically exemplified by metal phosphate salts such as titanium phosphate compounds, zirconium phosphate compounds, aluminum phosphate compounds, and copper phosphate compounds; metal sulfate salts such as titanium sulfate compounds, zirconium sulfate compounds, and aluminum sulfate compounds; metal carbonate salts such as titanium carbonate compounds, zirconium carbonate compounds, and aluminum carbonate compounds; and metal oxalate salts such as titanium oxalate compounds.

Among the preceding, the phosphate ion provides a high strength due to metal-to-metal bridging and also provides an excellent charge rise performance due to the presence of ionic bonding in the molecule, and the polyhydric acid metal salt thus preferably contains a metal phosphate salt and more preferably contains a titanium phosphate compound.

The method for obtaining the polyhydric acid metal salt is not particularly limited and known methods can be used. Preferred thereamong are methods in which the polyhydric acid metal salt is obtained by reacting, in an aqueous medium, the polyhydric acid ion with a metal compound that functions as the metal source.

The metal source should be a metal compound that yields the polyhydric acid metal salt by reacting with the polyhydric acid ion, but is not otherwise particularly limited and heretofore known metal compounds can be used.

Specific examples are metal chelates such as titanium lactate, titanium tetraacetylacetonate, ammonium titanium lactate, titanium triethanolaminate, zirconium lactate, ammonium zirconium lactate, aluminum lactate, aluminum trisacetylacetonate, and copper lactate, and metal alkoxides such as titanium tetraisopropoxide, titanium ethoxide, zirconium tetraisopropoxide, and aluminum trisisopropoxide.

Metal chelates are preferred among the preceding because their reaction is easily controlled and they react quantitatively with the polyhydric acid ion. Lactic acid chelates, e.g., titanium lactate, zirconium lactate, and so forth, are more preferred from the standpoint of solubility in aqueous media.

An ion of the aforementioned polyhydric acids can be used as the polyhydric acid ion. With regard to the form in the case of addition to an aqueous medium, the polyhydric acid may be added as such or a water-soluble polyhydric acid metal salt may be added to the aqueous medium and may dissociate in the aqueous medium.

When the polyhydric acid metal salt is obtained by the aforementioned method, the number-average particle diameter DA of the polyhydric acid metal salt fine particles can be controlled through, for example, the reaction temperature and starting material concentration during the synthesis of the polyhydric acid metal salt fine particles.

An advantageous example of the toner is an embodiment in which the toner includes fine particles B1 at the toner particle surface.

In addition, an advantageous example of the toner particle is an embodiment in which the toner particle includes a toner base particle and protruded portions B2 at the surface of the toner base particle.

The number-average particle diameter DB of fine particle B1 is preferably from 50 nm to 500 nm and is more preferably from 50 nm to 200 nm.

The number-average value of the protrusion height H of protruded portion B2 is preferably from 50 nm to 500 nm and is more preferably from 50 nm to 200 nm.

The previously described effects are more readily obtained when this number-average particle diameter DB or number-average value of the protrusion height H is in the indicated range. The number-average value of the protrusion height H can be controlled using the conditions during formation of the protruded portion. The details are given below.

When at least one of the fine particle B1 and the protruded portion B2 is present on the surface of the toner particle or toner base particle, it exhibits an effect as an assist material for bringing about elastic deformation when the toner particle or toner base particle undergoes elastic microdeformation during heating as described above.

For example, in the case of an embodiment in which the fine particles A that contain a metal element-containing compound is present at the toner particle surface, when the toner is heated the fine particles B1 or protruded portions B2 present at the surface of the toner particle or toner base particle act as an assist material when the toner particle or toner base particle undergoes elastic deformation and a large elastic deformation is established. This is thought to result in the formation of conduction paths caused by a network of the metal compound fine particles A at the toner particle surface, and thus in an increase in the charge injection capability.

Upon cooling, on the other hand, the toner particle or toner base particle readily returns to the state prior to heating. This is thought to result in an attenuation of this network structure and a loss of conduction paths, and as a consequence in an increase in the charge retention capability.

The coverage ratio of the toner particle surface by the fine particle B1 is preferably from 5% to 60% and is more preferably from 10% to 50%.

When the coverage ratio is in the indicated range, this facilitates elastic deformation when the toner particle undergoes elastic microdeformation upon heating and the amount of elastic deformation then becomes larger. As a result of this, the formation of conduction paths originating with the network of the metal compound fine particles A at the toner particle surface is facilitated and due to this the charge injection capability is further increased. In addition, upon cooling the toner particle or toner base particle readily returns to the state prior to heating. This results in an attenuation of this network structure and a loss of conduction paths, and as a consequence an additional increase in the charge retention capability readily occurs.

The ratio (DB/DA) of the number-average particle diameter DB of the fine particle B1 to the number-average particle diameter DA of the fine particle A that contains a metal element-containing compound (the unit for DA and DB is nm) is preferably from 2.0 to 20.0 and is more preferably from 3.0 to 18.0.

Having this ratio (DB/DA) satisfy the indicated range facilitates the suppression of contact between metal compound fine particles A upon cooling due to the spacer effect exercised by fine particle B1, and as a consequence can further increase the charge retention capability upon cooling.

Heretofore known fine particles can be used without particular limitation as the fine particle B1.

The volume resistivity of the fine particle B1 is preferably from $1.0\times10^{10}$ (Ω·m) to $1.0\times10^{16}$ (Ω·m) and is more preferably from $1.0\times10^{12}$ (Ω·m) to $1.0\times10^{16}$ (Ω·m).

Specific examples here are crosslinked and non-crosslinked resin fine particles, for which typical examples are polystyrenes, polyesters, polycarbonates, acrylic resins, melamine resins, urea resins, and phenolic resins; silica base material fine particles, e.g., wet-method silicas and dry-method silicas, and silica fine particles provided by the execution on such silica base material fine particles of a surface treatment using a treatment agent such as a silane coupling agent, titanium coupling agent, or silicone oil; and organosilicon polymer fine particles having an organosilicon polymer obtained by the polymerization of an organosilicon compound.

Among the preceding, crosslinked resin particles, organosilicon polymer fine particles, and silica fine particles are preferred because they exhibit a satisfactory hardness and thus readily exhibit the effect of an assist material for bringing about elastic deformation. In addition, organosilicon polymer fine particles and silica fine particles are preferred from the standpoints of providing an excellent charge retention capability due to a high resistance and also providing an excellent charge injection capability due to a facilitation of charge accumulation at the interface with the metal compound fine particles.

The content of fine particle B1 in the toner is preferably adjusted, in accordance with the number-average particle diameter DB of the fine particle B1 described above, so as to satisfy the preferred range for the coverage ratio of the toner particle surface by the fine particle B1.

The preferred range for this coverage ratio is readily satisfied using the fact that a smaller number-average particle diameter DB provides a smaller content and the fact that a larger number-average particle diameter DB provides a larger content. More specifically, the content of the fine particle B1 in the toner is preferably from 0.1 mass % to 5.0 mass %.

The protruded portion B2 at the toner base particle surface is, for example, a projecting feature present at the surface of the toner base particle. This feature preferably has, for example, a conical or hemispherical shape.

This hemispherical shape may be any shape having a curved surface close to a hemispherical shape and includes approximately hemispherical shapes. For example, hemi-true spherical shapes and hemi-elliptical spherical shapes are also included in this hemispherical shape. The hemispherical shape includes hemispherical shapes provided by sectioning with a plane that passes through the center of the sphere, i.e., half-spherical shapes. The hemispherical shape also includes hemispherical shapes provided by sectioning with a plane that does not pass through the center of the sphere, i.e., shapes larger than a half sphere and shapes smaller than a half sphere.

The coverage ratio of the toner base particle surface by the protruded portion B2 is preferably from 30% to 90% and is more preferably from 40% to 80%.

When this coverage ratio is in the indicated range, this facilitates elastic deformation when the toner base particle undergoes elastic microdeformation upon heating and the amount of elastic deformation then becomes larger. As a result of this, conduction paths originating with a network of the metal compound fine particles at the toner particle surface are formed and due to this the charge injection capability is further increased. In addition, upon cooling the toner base particle readily returns to the state prior to heating. This results in an attenuation of this network structure and a loss of conduction paths, and as a consequence an additional increase in the charge retention capability readily occurs.

The reason for the difference between the preferred range for the coverage ratio by the protruded portion B2 and the preferred range for the coverage ratio by the fine particle B1 resides in the different shapes of the protruded portion and fine particle. The protruded portion generally has a shape in which the base broadens out, and a higher coverage ratio is then preferred in order to obtain the same effect as an assist material for bringing about elastic deformation, as for the use of fine particles.

The ratio (number-average value of H/DA) of the number-average value of the protrusion height H of the protruded portion B2 to the number-average particle diameter DA of the fine particle A that contains a metal element-containing compound (the unit for H and DA is nm) is preferably from 2.0 to 20.0 and is more preferably from 3.0 to 18.0.

Having this ratio (number-average value of H/DA) satisfy the indicated range facilitates the suppression of contact between metal compound fine particles A upon cooling due to the spacer effect exercised by protruded portion B2, and as a consequence can further increase the charge retention capability upon cooling.

Heretofore known materials can be used without particular limitation as the material constituting the protruded portion B2.

The volume resistivity of the protruded portion B2 is preferably from $1.0\times10^{10}$ (Ω·m) to $1.0\times10^{16}$ (Ω·m) and is more preferably from $1.0\times10^{12}$ (Ω·m) to $1.0\times10^{16}$ (Ω·m).

Specific examples here are crosslinked and non-crosslinked resins, for which typical examples are polystyrenes, polyesters, polycarbonates, acrylic resins, melamine resins, urea resins, and phenolic resins; silicas, e.g., wet-method silicas and dry-method silicas; and organosilicon polymers obtained by the polymerization of an organosilicon compound.

Among the preceding, crosslinked resins, organosilicon polymers, and silica are preferred because they exhibit a satisfactory hardness and thus readily exhibit the effect of an assist material for bringing about elastic deformation.

In addition, organosilicon polymers and silica are preferred from the standpoints of providing an excellent charge retention capability due to a high resistance and also providing an excellent charge injection capability due to a facilitation of charge accumulation at the interface with the metal compound fine particles.

Organosilicon polymers, by virtue of having a suitable modulus of elasticity, are more preferred from the standpoint of facilitating control of the dielectric loss tangent of the toner into the aforementioned ranges even during repeated use.

Heretofore known organosilicon polymers can be used without particular limitation as this organosilicon polymer or as the organosilicon polymer that constitutes the organosilicon polymer fine particles. Among these, the use is preferred of an organosilicon polymer having the structure represented by the following formula (I).

$$R\text{—}SiO_{3/2} \qquad \text{formula (I)}$$

In formula (I), R represents an alkyl group having preferably 1 to 8 carbons and more preferably 1 to 6 carbons, an alkenyl group having preferably 1 to 6 carbons and more preferably 1 to 4 carbons, an acyl group having preferably 1 to 6 carbons and more preferably 1 to 4 carbons, an aryl group having preferably 6 to 14 carbons and more preferably 6 to 10 carbons, or a methacryloxyalkyl group.

Formula (I) indicates that the organosilicon polymer has an organic group and a silicon polymer moiety. As a consequence, an organosilicon polymer containing a structure with formula (I) firmly attaches to the toner base particle or toner particle because the organic group exhibits affinity for the toner base particle or toner particle and firmly attaches to the metal compound fine particles because the silicon polymer moiety exhibits affinity for the metal compound.

Thus, the organosilicon polymer, through its ability to attach to the toner base particle or toner particle and to the metal compound fine particles, can bring about a stronger attachment of the metal compound fine particles to the toner base particle or toner particle via the fine particle B1 or protruded portion B2.

Formula (I) also shows that the organosilicon polymer is crosslinked. The strength of the organosilicon polymer is increased because the organosilicon polymer has a crosslinked structure, while the hydrophobicity is increased because there is little residual silanol group. A toner can thus be obtained that has an even better durability and that exhibits stable properties even in high-humidity environments.

The R in formula (I) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred.

Due to control of the molecular mobility of the organic group, an organosilicon polymer having the instant structure has both hardness and flexibility, and as a consequence deterioration of the toner is suppressed, even in the case of long-term use, and excellent properties are exhibited.

Known organosilicon compounds can be used without particular limitation as the organosilicon compound for obtaining the organosilicon polymer. Among these, at least one selection from the group consisting of organosilicon compounds having the following formula (II) is preferred.

$$R—Si—Ra_3 \quad (II)$$

Each Ra in formula (II) independently represents a halogen atom or an alkoxy group having preferably 1 to 4 carbons and more preferably 1 to 3 carbons.

Each R independently represents an alkyl group having preferably 1 to 8 carbons and more preferably 1 to 6 carbons, an alkenyl group having preferably 1 to 6 carbons and more preferably 1 to 4 carbons, an aryl group having preferably 6 to 14 carbons and more preferably 6 to 10 carbons, an acyl group having preferably 1 to 6 carbons and more preferably 1 to 4 carbons, or a methacryloxyalkyl group.

The silane compound with formula (II) can be exemplified by trifunctional silane compounds such as trifunctional methylsilane compounds such as methyltrimethoxysilane, methyltriethoxysilane, methyldiethoxymethoxysilane, and methylethoxydimethoxysilane; trifunctional silane compounds such as ethyltrimethoxysilane, ethyltriethoxysilane, propyltrimethoxysilane, propyltriethoxysilane, butyltrimethoxysilane, butyltriethoxysilane, hexyltrimethoxysilane, and hexyltriethoxysilane; trifunctional phenylsilane compounds such as phenyltrimethoxysilane and phenyltriethoxysilane; trifunctional vinylsilane compounds such as vinyltrimethoxysilane and vinyltriethoxysilane; trifunctional allylsilane compounds such as allyltrimethoxysilane, allyltriethoxysilane, allyldiethoxymethoxysilane, and allylethoxydimethoxysilane; and trifunctional γ-methacryloxypropylsilane compounds such as γ-methacryloxypropyltrimethoxysilane, γ-methacryloxypropyltriethoxysilane, γ-methacryloxypropyldiethoxymethoxysilane, and γ-methacryloxypropylethoxydimethoxysilane.

The R in formula (II) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred.

When Ra is an alkoxy group, the organosilicon polymer can be obtained in a stable manner because a suitable reactivity in aqueous media is exhibited, and this is thus preferred. Ra is more preferably the methoxy group or ethoxy group.

The toner particle preferably includes at least a toner base particle. In addition, this toner base particle preferably contains a binder resin. The toner base particle as such may be the toner particle, or the toner particle may be provided by forming protruded portions on the surface of a toner base particle. The toner particle as such may be the toner, or the toner may be provided by causing an external additive, e.g., fine particles, to be present on the toner particle surface.

The content of the binder resin is preferably at least 50 mass % with reference to the total amount of the resin component in the toner particle or toner base particle.

Heretofore known resins can be used without particular limitation as the binder resin.

Specific examples are vinyl resins, e.g., styrene-acrylic resins and so forth, as well as epoxy resins, polyester resins, polyurethane resins, polyamide resins, cellulosic resins, and polyether resins and mixed resins and composite resins of the preceding.

Polyester resins and vinyl resins, e.g., styrene-acrylic resins and so forth, are preferred because they are easily and inexpensively acquired and provide an excellent low-temperature fixability. Styrene-acrylic resins are more preferred for their excellent development durability.

The volume resistivity of the toner base particle is preferably from $1.0\times10^{12}$ (Ω·m) to $1.0\times10^{16}$ (Ω·m) and is more preferably from $1.0\times10^{13}$ (Ω·m) to $1.0\times10^{16}$ (Ω·m).

The polyester resins may be produced, using a heretofore known method such as, for example, transesterification or polycondensation, from a combination of suitable selections from, e.g., polybasic carboxylic acids, polyols, hydroxycarboxylic acids, and so forth.

The polybasic carboxylic acids are compounds that contain two or more carboxy groups in each molecule. Among these, the dicarboxylic acids are compounds that contain two carboxy groups in each molecule, and their use is preferred.

Examples are oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexa-3,5-diene-1,2-dicarboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, and cyclohexanedicarboxylic acid.

Polybasic carboxylic acids other than the preceding dicarboxylic acids can be exemplified by the following:

trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid, and n-octenylsuccinic acid. A single one of these may be used by itself or two or more may be used in combination.

Polyols are compounds that have at least two hydroxyl groups in each molecule. Among these, diols are compounds that have two hydroxyl groups in each molecule, and their use is preferred.

Examples are ethylene glycol, diethylene glycol, triethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanediol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, hydrogenated bisphenol A, bisphenol A, bisphenol F, bisphenol S, and alkylene oxide (e.g., ethylene oxide, propylene oxide, butylene oxide) adducts on these bisphenols. Preferred among the preceding are alkylene glycols having 2 to 12 carbons and alkylene oxide adducts on bisphenols. Alkylene oxide adducts on bisphenols and their combinations with alkylene glycols having 2 to 12 carbons are particularly preferred.

At least trihydric alcohols can be exemplified by glycerol, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac, and alkylene oxide adducts on the preceding at least trihydric polyphenols. A single one of these may be used by itself or two or more may be used in combination.

The vinyl resins, e.g., styrene-acrylic resins and so forth, can be exemplified by homopolymers of the following polymerizable monomers, by copolymers obtained from a combination of two or more thereof, and by mixtures of the preceding:

styrene and styrene derivatives, e.g., α-methylstyrene, β-methylstyrene, o-methylstyrene, m-methyl styrene, p-methyl styrene, 2,4-dimethyl styrene, p-n-butylstyrene, p-tert-butyl styrene, p-n-hexylstyrene, p-n-octylstyrene, p-n-nonylstyrene, p-n-decylstyrene, p-n-dodecylstyrene, p-methoxystyrene, and p-phenylstyrene;

(meth)acrylic derivatives such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth) acrylate, cyclohexyl (meth)acrylate, benzyl (meth) acrylate, dimethyl phosphate ethyl (meth)acrylate, diethyl phosphate ethyl (meth)acrylate, dibutyl phosphate ethyl (meth)acrylate, 2-benzoyloxyethyl (meth) acrylate, (meth)acrylonitrile, 2-hydroxyethyl (meth) acrylate, (meth)acrylic acid, and maleic acid;

vinyl ether derivatives such as vinyl methyl ether and vinyl isobutyl ether; vinyl ketone derivatives such as vinyl methyl ketone, vinyl ethyl ketone, and vinyl isopropenyl ketone; and olefins such as ethylene, propylene, and butadiene.

As necessary, a multifunctional polymerizable monomer may be used for the vinyl resin, e.g., styrene-acrylic resins and so forth. The multifunctional polymerizable monomer can be exemplified by diethylene glycol di(meth)acrylate, triethylene glycol di(meth)acrylate, tetraethyl ene glycol di(meth)acrylate, polyethylene glycol di(meth)acrylate, 1,6-hexanediol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolmethane tetra(meth)acrylate, divinylbenzene, divinylnaphthalene, and divinyl ether.

A known chain transfer agent and polymerization inhibitor may also be added in order to control the degree of polymerization.

The polymerization initiator used to obtain these resins can be exemplified by organoperoxide-type initiators and azo-type polymerization initiators.

The organoperoxide-type initiators can be exemplified by benzoyl peroxide, lauroyl peroxide, di-α-cumyl peroxide, 2,5-dimethyl-2,5-bis(benzoylperoxy)hexane, bis(4-t-butylcyclohexyl) peroxydicarbonate, 1,1-bis(t-butylperoxy)cyclododecane, t-butyl peroxymaleate, bis(t-butylperoxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide, and tert-butyl peroxypivalate.

The azo-type polymerization initiators are exemplified by 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobismethylbutyronitrile, and 2,2'-azobis(methyl isobutyrate).

A redox initiator, comprising the combination of an oxidizing substance with a reducing substance, may also be used as the polymerization initiator. The oxidizing substance can be exemplified by inorganic peroxides, e.g., hydrogen peroxide and persulfate salts (sodium salt, potassium salt, ammonium salt), and by oxidizing metal salts, e.g., salts of tetravalent cerium. The reducing substance can be exemplified by reducing metal salts (divalent iron salts, monovalent copper salts, and trivalent chromium salts); ammonia; lower amines (amines having from 1 to about 6 carbons, such as methylamine and ethylamine); amino compounds such as hydroxylamine; reducing sulfur compounds such as sodium thiosulfate, sodium hydrosulfite, sodium bisulfite, sodium sulfite, and sodium formaldehyde sulfoxylate; lower alcohols (from 1 to 6 carbons); ascorbic acid and its salts; and lower aldehydes (from 1 to 6 carbons).

The polymerization initiator is selected considering its 10-hour half-life temperature, and a single one or a mixture may be used. The amount of addition of the polymerization initiator will vary with the desired degree of polymerization, but generally from 0.5 mass parts to 20.0 mass parts is added per 100.0 mass parts of the polymerizable monomer.

The toner base particle may contain a colorant. The heretofore known magnetic bodies and pigments and dyes in the colors of black, yellow, magenta, and cyan as well as in other colors, and so forth, may be used without particular limitation as this colorant.

The black colorant can be exemplified by black pigments such as carbon black.

The yellow colorant can be exemplified by yellow pigments and yellow dyes, e.g., monoazo compounds, disazo compounds, condensed azo compounds, isoindolinone compounds, benzimidazolone compounds, anthraquinone compounds, azo metal complexes, methine compounds, and allylamide compounds.

Specific examples are C.I. Pigment Yellow 74, 93, 95, 109, 111, 128, 155, 174, 180, and 185 and C.I. Solvent Yellow 162.

The magenta colorants can be exemplified by magenta pigments and magenta dyes, e.g., monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, and C.I. Pigment Violet 19.

The cyan colorants can be exemplified by cyan pigments and cyan dyes, e.g., copper phthalocyanine compounds and derivatives thereof, anthraquinone compounds, and basic dye lake compounds.

Specific examples are C.I. Pigment Blue 1, 7, 15, 15:1, 15:2, 15:3, 15:4, 60, 62, and 66.

The colorant content, considered per 100.0 mass parts of the binder resin or polymerizable monomer that forms the binder resin, is preferably from 1.0 mass parts to 20.0 mass parts.

The toner may also be made into a magnetic toner by the incorporation of a magnetic body.

In this case, the magnetic body may also function as a colorant.

The magnetic body can be exemplified by iron oxides as represented by magnetite, hematite, and ferrite; metals as represented by iron, cobalt, and nickel; alloys of these metals with a metal such as aluminum, cobalt, copper, lead, magnesium, tin, zinc, antimony, beryllium, bismuth, cadmium, calcium, manganese, selenium, titanium, tungsten, and vanadium; and mixtures thereof.

The toner base particle may contain a release agent. Heretofore known waxes may be used without particular limitation as this release agent. The following are specific examples:

petroleum waxes as represented by paraffin waxes, microcrystalline waxes, and petrolatum, and derivatives thereof; montan wax and derivatives thereof; hydrocarbon waxes provided by the Fischer-Tropsch method, and derivatives thereof; polyolefin waxes as represented by polyethylene, and derivatives thereof and natural waxes as represented by carnauba wax and candelilla wax, and derivatives thereof.

The derivatives here include oxides as well as block copolymers and graft modifications with vinyl monomers.

Other examples are alcohols such as higher aliphatic alcohols; fatty acids such as stearic acid and palmitic acid, and their acid amides, esters, and ketones; hardened castor oil and derivatives thereof plant waxes; and animal waxes. A single one of these or a combination thereof may be used.

Among the preceding, a trend of an enhanced developing performance and transferability is exhibited when a polyolefin, a hydrocarbon wax provided by the Fischer-Tropsch method, or a petroleum wax is used, which is thus preferred.

An oxidation inhibitor may be added to these waxes in a range that does not influence the effects described above.

The release agent content, considered per 100.0 mass parts of the binder resin or polymerizable monomer that forms the binder resin, is preferably from 1.0 mass parts to 30.0 mass parts.

The melting point of the release agent is preferably from 30° C. to 120° C. and is more preferably from 60° C. to 100° C.

The use of a release agent exhibiting such a thermal behavior results in an efficient expression of the release effect and the provision of a broader fixing window.

The toner base particle may contain a plasticizer. There are no particular limitations on this plasticizer, and, for example, the heretofore known plasticizers used in toners may be used.

A compound that exercises a plasticizing activity on the binder resin (a plasticizer) may be used to adjust and control the Ta of the toner. In this case the plasticizer preferably has a molecular weight of not more than 1,500.

Specific examples are esters between a monohydric alcohol and an aliphatic carboxylic acid or esters between a monobasic carboxylic acid and an aliphatic alcohol, such as behenyl behenate, stearyl stearate, and palmityl palmitate; esters between a dihydric alcohol and an aliphatic carboxylic acid or esters between a dibasic carboxylic acid and an aliphatic alcohol, such as ethylene glycol distearate, dibehenyl sebacate, and hexanediol dibehenate; esters between a trihydric alcohol and an aliphatic carboxylic acid or esters between a tribasic carboxylic acid and an aliphatic alcohol, such as glycerol tribehenate; esters between a tetrahydric alcohol and an aliphatic carboxylic acid or esters between a tetrabasic carboxylic acid and an aliphatic alcohol, such as pentaerythritol tetrastearate and pentaerythritol tetrapalmitate; esters between a hexahydric alcohol and an aliphatic carboxylic acid or esters between a hexabasic carboxylic acid and an aliphatic alcohol, such as dipentaerythritol hexastearate and dipentaerythritol hexapalmitate; esters between a polyhydric alcohol and an aliphatic carboxylic acid or esters between a polybasic carboxylic acid and an aliphatic alcohol, such as polyglycerol behenate; and natural ester waxes such as carnauba wax and rice wax. A single one or a combination of these may be used.

Among the preceding, and viewed from the standpoint of enhancing the compatibility with the binder resin, preferably a monohydric alcohol/aliphatic carboxylic acid ester, dibasic carboxylic acid/aliphatic alcohol ester, or dihydric alcohol/aliphatic carboxylic acid ester is included. An ester wax having the structure given by the following formula (III) or formula (IV) is more preferably included.

Through selection of these plasticizers, the temperature Ta when G' is $1.0\times10^5$ Pa in dynamic viscoelastic measurement of the toner, infra, is readily controlled into a favorable range and the amount of elastic deformation under the application of pressure is readily controlled into a favorable range.

(III)

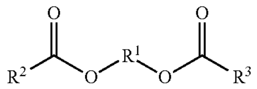

(IV)

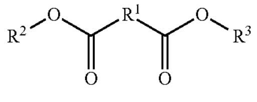

In formulas (III) and (IV), le represents an alkylene group having from 1 to 6 carbons and $R^2$ and $R^3$ each independently represent a straight-chain alkyl group having from 11 to 25 carbons.

The content of the plasticizer, expressed per 100.0 mass parts of the binder resin or polymerizable monomer that forms the binder resin, is preferably from 1.0 mass parts to 50.0 mass parts and is more preferably from 5.0 mass parts to 30.0 mass parts.

The toner base particle may contain a charge control agent. A known charge control agent may be used without particular limitation as this charge control agent.

Examples of negative-charging charge control agents are as follows:

metal compounds of aromatic carboxylic acids such as salicylic acid, alkylsalicylic acids, dialkylsalicylic acids, naphthoic acid, and dicarboxylic acids, and polymers and copolymers that have this metal compound of an aromatic carboxylic acid; polymers and copolymers that have a sulfonic acid group, sulfonate salt group, or sulfonate ester group; metal salts and metal complexes of azo dyes and azo pigments; boron compounds; silicon compounds; and calixarene.

Positive-charging charge control agents are exemplified by the following:

quaternary ammonium salts and polymeric compounds that have a quaternary ammonium salt in side chain position; guanidine compounds; nigrosine compounds; and imidazole compounds.

The polymers and copolymers that have a sulfonate salt group or sulfonate ester group can be exemplified by homopolymers of a sulfonic acid group-containing vinyl monomer such as styrenesulfonic acid, 2-acrylamido-2-methylpropanesulfonic acid, 2-methacrylamido-2-methylpropanesulfonic acid, vinylsulfonic acid, and methacrylsulfonic acid, and by copolymers of these sulfonic acid group-containing vinyl monomers with vinyl monomer as indicated in the section on the binder resin.

The content of the charge control agent, considered per 100.0 mass parts of the binder resin or polymerizable monomer that forms the binder resin, is preferably from 0.01 mass parts to 5.0 mass parts.

The toner particle may contain a heretofore known external additive without particular limitation in addition to the metal compound fine particle A and the fine particle B1.

The following are specific examples:

base silica fine particles, e.g., silica produced by a wet method or silica produced by a dry method, and surface-treated silica fine particles provided by subjecting such base silica fine particles to a surface treatment with a treatment agent such as a silane coupling agent, titanium coupling agent, silicone oil, and so forth, as well as resin fine particles such as vinylidene fluoride fine particles, polytetrafluoroethylene fine particles, and so forth.

Among the preceding, toner lacking the previously described protruded portion B2 preferably contains surface-treated silica fine particles having a number-average primary particle diameter of from 5 nm to 20 nm.

The content of external additive other than the metal compound fine particle A and the fine particle B1 is preferably from 0.1 mass parts to 5.0 mass parts per 100.0 mass parts of the toner particle.

An example of methods for obtaining the herein described toner particle is provided in the following, but this should not be understood as a limitation to or by the following.

A specific procedure for forming a specific protruded portion on the toner base particle surface is, for example, a method in which a material having a specific elastic modulus is attached by a dry method onto the toner base particle using a mechanical external force so as to provide the shape of the above-described protruded portion. Another example, on the other hand, is a wet procedure in which organosilicon polymer-containing protruded portions are formed on the toner base particle surface.

Heretofore known methods can be used without particular limitation as the method of formation when organosilicon polymer-containing protruded portions are to be formed on the toner base particle surface.

Among others, a method in which the protruded portions are formed on the toner base particle by condensing an organosilicon compound in an aqueous medium in which toner base particles are dispersed, is a preferred example, because this method enables the protruded portions to be tightly bonded to the toner base particle.

This method is described in the following.

The formation of protruded portions on the toner base particle by this method preferably comprises a step (step 1) of obtaining a toner base particle dispersion of toner base particles dispersed in an aqueous medium, and a step (step 2) of mixing an organosilicon compound (and/or hydrolyzate thereof) into the toner base particle dispersion and forming organosilicon polymer-containing protruded portions on the toner base particles by causing a condensation reaction of the organosilicon compound in the toner base particle dispersion.

The method for obtaining the toner base particle dispersion in step 1 can be exemplified by the following methods: use as such of a dispersion of toner base particles that have been produced in an aqueous medium; and introduction into an aqueous medium of dried toner base particles with mechanical dispersion. A dispersing aid may be used when the dried toner base particles are dispersed in an aqueous medium.

For example, a known dispersion stabilizer or surfactant can be used as the dispersing aid.

The dispersion stabilizer can be specifically exemplified by the following: inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina, and organic dispersion stabilizers such as polyvinyl alcohol, gelatin, methyl cellulose, methyl hydroxypropyl cellulose, ethyl cellulose, sodium carboxymethyl cellulose, and starch.

The surfactant can be exemplified by anionic surfactants, e.g., alkyl sulfate ester salts, alkylbenzenesulfonate salts, and fatty acid salts; nonionic surfactants such as polyoxyethylene alkyl ethers and polyoxypropylene alkyl ethers; and cationic surfactants such as alkylamine salts and quaternary ammonium salts.

Among the preceding, the presence of an inorganic dispersion stabilizer is preferred, and the presence of a dispersion stabilizer comprising a phosphate salt, e.g., tricalcium phosphate, hydroxyapatite, magnesium phosphate, zinc phosphate, aluminum phosphate, and so forth, is more preferred.

In step 2, the organosilicon compound as such may be added to the toner base particle dispersion, or it may be subjected to hydrolysis followed by addition to the toner base particle dispersion. Preferred therebetween is addition post-hydrolysis, because this facilitates control of the aforementioned condensation reaction and reduces the amount of the organosilicon compound that remains in the toner base particle dispersion.

The hydrolysis is preferably carried out in an aqueous medium having a pH adjusted using a known acid or base. The hydrolysis of organosilicon compounds is known to exhibit a dependence on pH, and the pH when this hydrolysis is carried out is preferably varied as appropriate depending on the species of the organosilicon compound. For example, the pH of the aqueous medium is preferably from 2.0 to 6.0 when methyltriethoxysilane is used as the organosilicon compound.

The acid used to adjust the pH can be specifically exemplified by inorganic acids such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodous acid, iodous acid, iodic acid, periodic acid, sulfuric acid, nitric acid, phosphoric acid, boric acid, and so forth, and by organic acids such as acetic acid, citric acid, formic acid, gluconic acid, lactic acid, oxalic acid, tartaric acid, and so forth.

The following are specific examples of bases for adjusting the pH:

alkali metal hydroxides such as potassium hydroxide, sodium hydroxide, and lithium hydroxide, and their aqueous solutions; alkali metal carbonates such as potassium carbonate, sodium carbonate, and lithium carbonate, and their aqueous solutions; alkali metal sulfates such as potassium sulfate, sodium sulfate, and lithium sulfate, and their aqueous solutions; alkali metal phosphates such as potassium phosphate, sodium phosphate, and lithium phosphate, and their aqueous solutions; alkaline-earth metal hydroxides such as calcium hydroxide and magnesium hydroxide, and their aqueous solutions; ammonia; and amines such as triethylamine.

The condensation reaction in step 2 is preferably controlled by adjusting the pH of the toner base particle dispersion. The condensation reaction of organosilicon compounds is known to exhibit a dependence on pH, and the pH when the condensation reaction is carried out is preferably varied as appropriate depending on the species of the organosilicon compound. For example, the pH of the aqueous medium is preferably from 6.0 to 12.0 when methyltriethoxysilane is used as the organosilicon compound. For example, the number-average value of the protrusion height H of the protruded portion B2 can be controlled by adjusting the pH. Those acids and bases provided as examples in the section on hydrolysis can be used as the acids and bases used to adjust the pH.

There are no particular limitations on the procedure for causing the fine particles A that contain a metal element-containing compound to be present at the toner particle surface, but the following methods can be provided as examples.

The use of a polyhydric acid metal salt as the fine particles A that contain a metal element-containing compound is described as an example.

(1) A method in which fine particles of the polyhydric acid metal salt are obtained by reacting, in an aqueous medium in which toner particles are dispersed, a polyhydric acid ion with a metal element-containing compound serving as a metal source.

(2) A method in which polyhydric acid metal salt fine particles are chemically attached to the toner particle in an aqueous medium in which the toner particles are dispersed.

(3) A method in which polyhydric acid metal salt fine particles are attached by mechanical external force to the toner particle using a wet or dry method.

Preferred among the preceding is the method in which fine particles of the polyhydric acid metal salt are obtained by reacting, in an aqueous medium in which toner particles are dispersed, a polyhydric acid ion with a metal element-containing compound serving as a metal source.

The use of this method makes it possible to bring about a uniform dispersion of the polyhydric acid metal salt fine particles on the toner particle surface. As a result, the conduction paths can be efficiently formed and an injection charging capability can then be obtained with fewer of the polyhydric acid metal salt fine particles.

On the other hand, there are no particular limitations on the method for causing the fine particles A that contain a metal element-containing compound to be contained by the protruded portion and for bringing about the presence of the fine particle A that contains a metal element-containing compound at the surface of the protruded portion, but the following method can be provided as an example.

The use of a polyhydric acid metal salt as the fine particle A that contains a metal element-containing compound is described as an example.

During the execution of a reaction, in an aqueous medium in which toner particles are dispersed, between a polyhydric acid ion and a metal element-containing compound serving as a metal source, an organosilicon compound is added to the aqueous medium at the same time and a condensation reaction of the organosilicon compound is run in the aqueous medium. As a result, the protruded portion will contain an organosilicon polymer and the fine particle A that contains a metal element-containing compound, and the presence of the fine particle A that contains a metal element-containing compound at the protruded portion surface can also be brought about.

By using this method, the polyhydric acid metal salt fine particles that are produced in the aqueous medium are fixed, prior to their growth, to the protruded portion surface by the organosilicon polymer, which makes it possible to increase the dispersity of the polyhydric acid metal salt fine particles. In addition, the polyhydric acid metal salt fine particles are securely attached by the organosilicon polymer to the protruded portion surface, and as a consequence a highly durable toner can be obtained that can display injection charging characteristics in a stable manner even during long-term use.

The previously described metal element-containing compound, polyhydric acid, and organosilicon compound can be used, respectively, for the metal element-containing compound, polyhydric acid, and organosilicon compound here.

The method for producing the toner base particle is not particularly limited, and a suspension polymerization method, dissolution suspension method, emulsion aggregation method, pulverization method, and so forth can be used. The suspension polymerization method, dissolution suspension method, and emulsion aggregation method are preferred here because they facilitate control of the average circularity of the toner into the preferred range.

The method of obtaining the toner base particle by suspension polymerization is described in the following as an example.

First, the polymerizable monomer that will produce the binder resin is mixed with any optional additives, and, using a disperser, a polymerizable monomer composition is prepared in which these materials are dissolved or dispersed.

The additives can be exemplified by colorants, release agents, plasticizers, charge control agents, polymerization initiators, chain transfer agents, and so forth.

The disperser can be exemplified by homogenizers, ball mills, colloid mills, ultrasound dispersers, and so forth.

The polymerizable monomer composition is then introduced into an aqueous medium that contains sparingly water-soluble inorganic fine particles, and droplets of the polymerizable monomer composition are prepared using a high-speed disperser such as a high-speed stirrer or an ultrasound disperser (granulation step).

The toner base particle is then obtained by polymerizing the polymerizable monomer in the polymerizable monomer composition droplets (polymerization step).

The polymerization initiator may be admixed during the preparation of the polymerizable monomer composition or may be admixed into the polymerizable monomer composition immediately prior to droplet formation in the aqueous medium.

In addition, it may also be added, optionally dissolved in the polymerizable monomer or another solvent, during granulation into droplets or after the completion of granulation, i.e., immediately before the initiation of the polymerization reaction.

After the binder resin has been obtained by the polymerization of the polymerizable monomer, the toner base particle dispersion may be obtained by the optional execution of a solvent removal process.

Heretofore known monomers may be used without particular limitation as the polymerizable monomer when the binder resin is obtained by, for example, an emulsion aggregation method or a suspension polymerization method. Specific examples here are the vinyl monomers provided in the section on the binder resin.

A known polymerization initiator may be used without particular limitation as the polymerization initiator. Specific examples are as follows:

peroxide-type polymerization initiators, for which typical examples are hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, per-N-(3-tolyl) palmitate-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, and so forth; and azo and diazo polymerization initiators, for which typical examples are 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and so forth.

A process cartridge and an image-forming apparatus are described in the following, but this should not be understood as a limitation thereto or thereby. The instant toner may be used in heretofore known process cartridges and image-forming apparatuses without particular limitation.

Examples in this regard are image-forming apparatuses based on a monocomponent contact development system, a two-component development system, or a monocomponent jumping development system, and process cartridges detachably disposed in the main unit of the image-forming apparatus.

A preferred process cartridge here is detachably mounted in the main unit of the image-forming apparatus, the process cartridge including

- a toner carrying member that carries a toner; and
- a toner control member that abuts the toner carrying member to control the toner carried by the toner carrying member.

In addition, a preferred image-forming apparatus includes

- an image bearing member on which an electrostatic latent image is formed;
- a toner carrying member that carries a toner and develops the electrostatic latent image into a toner image;
- a toner control member that abuts the toner carrying member to control the toner carried by the toner carrying member; and
- an application member that applies a bias between the toner carrying member and the toner control member.

A more specific example of an image-forming apparatus is an image-forming apparatus that includes: an image bearing member on which an electrostatic latent image is formed; a toner carrying member that carries a toner and develops the electrostatic latent image into a toner image; and a toner control member that is disposed so as to form an abutting region with the toner carrying member and that controls the amount of toner on the toner carrying member, the image-forming apparatus including: a means for obtaining a toner image by the toner carrying member carrying and transporting toner to the surface of the image bearing member and thereby developing the electrostatic latent image formed on the image bearing member, wherein the means for obtaining a toner image is a transfer means for transferring the toner image to a transfer material with or without an intervening intermediate transfer member; and a fixing means for fixing, to the transfer material, the toner image that has been transferred to the transfer material, the image-forming apparatus further including an application member that applies a bias between the toner carrying member and the toner control member.

The process cartridge can be more specifically exemplified by a process cartridge that includes: a toner carrying member that carries toner; and a toner control member that is disposed so as to form an abutting region with the toner carrying member and controls the amount of toner on the toner carrying member, wherein the toner carrying member carries and transports toner to the surface of the image bearing member, and thereby develops the electrostatic latent image formed on the image bearing member to obtain a toner image.

The specific description of an image-forming apparatus that utilizes a monocomponent contact developing system is taken up as an example in the following, but there is no limitation to the following architecture.

The architecture of the image-forming apparatus as a whole is described first.

FIG. 1 is a schematic cross-sectional diagram of an image-forming apparatus 100. The image-forming apparatus 100 is a full-color laser printer that employs an inline system and an intermediate transfer system. The image-forming apparatus 100 can form a full-color image on a recording material (for example, recording paper, plastic sheet, fabric, and so forth) in accordance with image information. The image information is input into the image-forming apparatus main unit 100A from an image-scanning device connected to the image-forming apparatus main unit 100A or from a host device, e.g., a personal computer communicatively connected to the image-forming apparatus main unit 100A.

The image-forming apparatus 100 has, as a plurality of image-forming members, a first, second, third, and fourth image-forming members SY, SM, SC, and SK for forming an image in each of the colors yellow (Y), magenta (M), cyan (C), and black (K), respectively.

The constitution and operation of the first to fourth image-forming members SY, SM, SC, and SK are substantially the same, except the colors of the images formed are different. Accordingly, in those instances where a specific distinction need not be made, an overall description is provided and the suffixes Y, M, C, and K, which are assigned to a reference sign in order to indicate that a component is used for a particular color, have been omitted.

The image-forming apparatus 100 has, as a plurality of image bearing members, four drum-shaped electrophotographic photosensitive members provided side-by-side in the direction that intersects the vertical direction, i.e., has photosensitive drums 1. The photosensitive drum 1 is rotatably driven by a drive means (drive source) (not shown) in the direction shown by the arrow A in the diagram (clockwise direction). The following are disposed on the circumference of the photosensitive drum 1: a charging roller 2, as a charging means, that uniformly charges the surface of the photosensitive drum 1; and a scanner unit (photoexposure device) 3, as a photoexposure means, that irradiates a laser based on image information and forms an electrostatic image (electrostatic latent image) on the photosensitive drum 1. The following are also disposed on the circumference of the photosensitive drum 1: a developing unit (developing apparatus) 4, as a development means, that develops the electrostatic image as a toner image; and a cleaning member 6, as a cleaning means, that removes the toner (untransferred toner) that remains on the surface of the photosensitive drum 1 after transfer. Also provided, as an intermediate transfer member facing the four photosensitive drums 1, is an intermediate transfer belt 5 for transferring the toner image on the photosensitive drum 1 to the recording material 12.

The developing unit 4 uses toner as a developer. In addition, the developing unit 4 carries out reverse development by contacting the developing roller (described below) as a toner carrying member with the photosensitive drum 1. That is, the developing unit 4 develops the electrostatic image by attaching the toner, charged to the same polarity as the charging polarity of the photosensitive drum 1 (negative polarity in this example), to those areas (image areas, photoexposed areas) where the charge on the photosensitive drum 1 has been depleted by photoexposure.

The intermediate transfer belt 5, which as an intermediate transfer member is formed as an endless belt, abuts all of the photosensitive drums 1 and engages in circular motion (rotation) in the direction of the arrow B in the diagram (counterclockwise direction). The intermediate transfer belt 5 runs over a driver roller 51, a secondary transfer opposing roller 52, and a driven roller 53 functioning as a plurality of support members.

Four primary transfer rollers 8 are disposed, as primary transfer means, on the inner circumference side of the intermediate transfer belt 5, in a row and facing the respective photosensitive drums 1. A primary transfer roller 8 presses the intermediate transfer belt 5 toward the photosensitive drum 1 to form a primary transfer region N1 in which the intermediate transfer belt 5 abuts the photosensitive drum 1. A bias with a polarity reversed from the regular charging polarity of the toner is applied to the primary transfer roller 8 from a primary transfer bias power source (high-voltage power source) (not shown) as a primary transfer bias application means. This functions to transfer the toner image on the photosensitive drum 1 onto the intermediate transfer belt 5.

A secondary transfer roller 9 is disposed as a secondary transfer means on the outer circumference side of the intermediate transfer belt 5 and in a position opposite from the secondary transfer opposing roller 52. The secondary transfer roller 9 presses against the secondary transfer opposing roller 52 with the intermediate transfer belt 5 disposed therebetween, to form a secondary transfer region N2 at which the intermediate transfer belt 5 abuts the secondary transfer roller 9. In addition, a bias with a reverse polarity from the regular charging polarity of the toner is applied to the secondary transfer roller 9 from a secondary transfer bias power source (high-voltage power source) (not shown) serving as a secondary transfer bias application means. This functions to transfer (secondary transfer) the toner image on the intermediate transfer belt 5 to the recording material 12.

Continuing the description, when image formation is carried out, the surface of the photosensitive drum 1 is first uniformly charged by the charging roller 2. The surface of the charged photosensitive drum 1 is then subjected to scanning exposure by laser light in correspondence to the image information generated from the scanner unit 3, thus forming on the photosensitive drum 1 an electrostatic image that corresponds to the image information. The electrostatic image formed on the photosensitive drum 1 is then developed into a toner image by the developing unit 4. The toner image formed on the photosensitive drum 1 is transferred (primary transfer) by the action of the primary transfer roller 8 onto the intermediate transfer belt 5.

For example, when a full-color image is to be formed, this process is performed in sequence at the first through fourth image-forming members SY, SM, SC, and SK and the toner images for each color undergo primary transfer with sequential stacking onto the intermediate transfer belt 5.

After this, the recording material 12 is transported to the secondary transfer region N2 in synchronization with the movement of the intermediate transfer belt 5. The four-color toner image on the intermediate transfer belt 5 undergoes secondary transfer all at once onto the recording material 12 under the action of the secondary transfer roller 9, which abuts the intermediate transfer belt 5 with the recording material 12 disposed therebetween.

The recording material 12, with the toner image transferred thereto, is transported to the fixing apparatus 10, which functions as a fixing means. The toner image is fixed to the recording material 12 through the application of heat and pressure to the recording material 12 at the fixing apparatus 10.

In addition, after the primary transfer step, the primary untransferred toner remaining on the photosensitive drum 1 is removed by the cleaning member 6 and is recovered. The secondary untransferred toner remaining on the intermediate transfer belt 5 after the secondary transfer step is cleaned off by the intermediate transfer belt cleaning apparatus 11.

The image-forming apparatus 100 may also be configured to form a monochrome image or a multicolor image through the use of only a single desired image-forming member or through the use of only several (but not all) of the image-forming members.

The overall construction of the process cartridge 7 installed in the image-forming apparatus 100 is described in the following. The construction and operation of the process cartridge 7 are substantially the same for each color, with the exception of the type of toner (color) filled therein.

Figure 2:
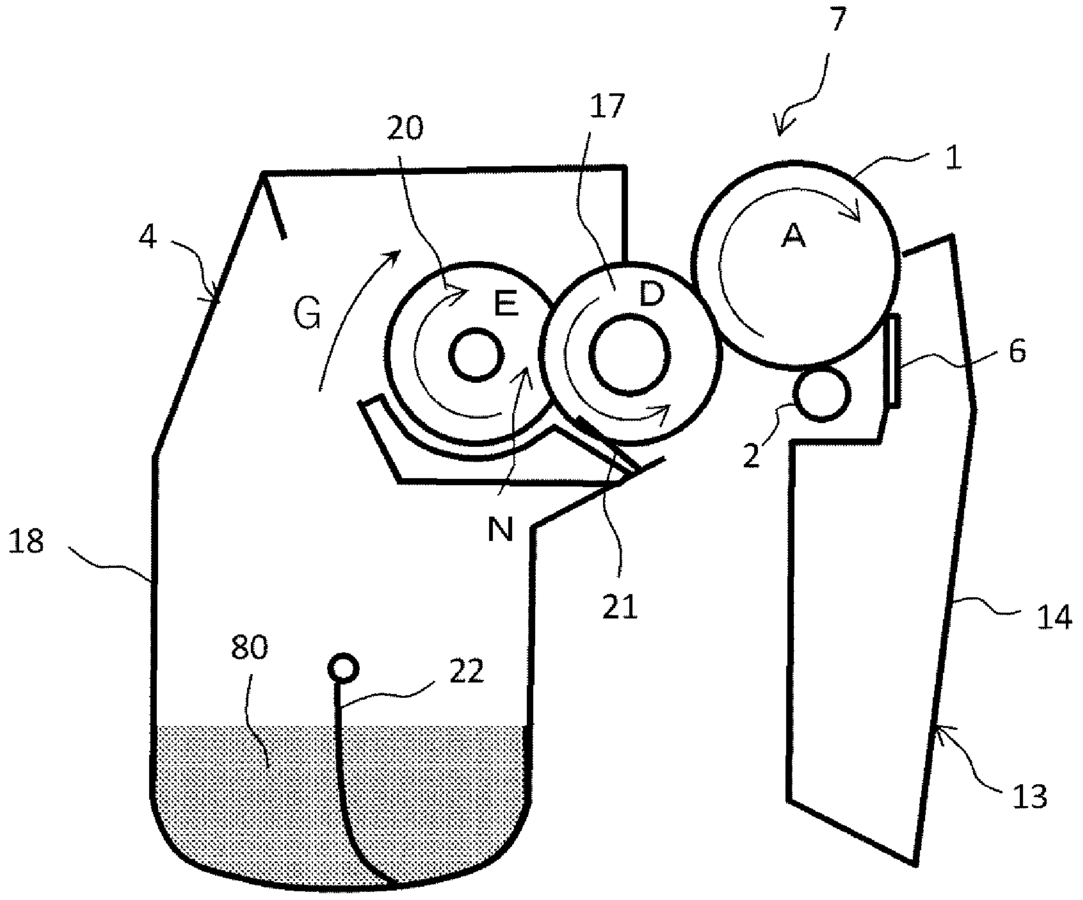
FIG. 2 contains an example of a cross-sectional diagram of a process cartridge.

FIG. 2 is a schematic cross-sectional (main cross section) diagram of a process cartridge 7 viewed along the length direction (rotational axis direction) of the photosensitive drum 1. The attitude of the process cartridge 7 in FIG. 2 is the attitude for the state as installed in the main unit of the image-forming apparatus, and explanations in the following with regard to the positional relationships of the members of the process cartridge, directions, and so forth, refer to the positional relationships, directions, and so forth for this attitude.

The process cartridge 7 is constructed by the integration into a single article of a photosensitive member unit 13, which is provided with a photosensitive drum 1 and so forth, and a developing unit 4, which is provided with a developing roller 17 and so forth.

The photosensitive member unit 13 has a cleaning frame 14 that functions as a frame that supports various components in the photosensitive member unit 13. A photosensitive drum 1 is rotatably installed via a bearing (not shown) in the cleaning frame 14. Through the transmission to the photosensitive member unit 13 of a drive force from a drive motor (not shown) functioning as a drive means (drive source), the photosensitive drum 1 is rotatably driven in the direction of the arrow A in the diagram (clockwise direction) in correspondence to the image-formation operation.

A cleaning member 6 and a charging roller 2 are disposed in the photosensitive member unit 13 so as to contact the peripheral surface of the photosensitive drum 1. The untransferred toner removed from the surface of the photosensitive drum 1 by the cleaning member 6 falls into the cleaning frame 14 and is held there.

The charging roller 2, which is a charging means, is rotatably driven by the pressurized contact of the conductive rubber roller part with the photosensitive drum 1.

Here, a prescribed direct-current voltage versus the photosensitive drum 1 is applied as a charging step to the metal core of the charging roller 2, and this causes the formation of a uniform dark potential (Vd) at the surface of the photosensitive drum 1. A laser light spot pattern emitted in correspondence to the image data by laser light from the aforementioned scanner unit 3 is irradiated onto the photosensitive drum 1, and, in those locations undergoing irradiation, the surface charge is dissipated by carriers from the carrier generation layer and the potential declines. As a result, an electrostatic latent image, of irradiated regions having a prescribed light potential (Vl) and nonirradiated regions having a prescribed dark potential (Vd), is formed on the photosensitive drum 1.

The developing unit 4, on the other hand, has a developing roller 17, functioning as a toner carrying member for carrying the toner 80, and has a developing compartment, in which there is disposed a toner feed roller 20 functioning as a feed member that feeds the toner to the developing roller 17. The developing unit 4 is also provided with a toner holder 18.

The toner feed roller 20 rotates while forming an abutting region N with the developing roller 17. In FIG. 2, the toner feed roller 20 and the developing roller 17 rotate in directions wherein their respective surfaces move from the top to the bottom of the abutting region N (the direction of arrow E and the direction of arrow D in the figure); however, the toner feed roller 20 may assume either rotation direction in the present disclosure.

A stirring transport member 22 is disposed in the toner holder 18. The stirring transport member 22 stirs the toner held in the toner holder 18 and transports the toner in the direction of the arrow Gin the diagram toward the upper part of the toner feed roller 20.

The developing blade 21 is disposed beneath the developing roller 17 and counter-abuts the developing roller and carries out charge provision and regulation of the coating amount for the toner fed by the toner feed roller 20.

The developing roller 17 and the photosensitive drum 1 respectively rotate such that their respective surfaces move in the same direction in their facing region.

In order to carry out injection charging on the toner 80, for example, the effects appear and an injection charging capability appears through the toner being heated, to a degree that does not cause melting, between the developing blade 21 and the developing roller 17. At this point, and at the same time as the execution of the controlling process that controls the coating amount between the developing blade 21 and the developing roller 17, a bias may be applied, using an application member that applies a bias, between the developing blade 21 (toner control member) and the developing roller 17 (toner carrying member). By doing this, charge can be injected from the developing blade into the toner carried on the developing roller and the charge quantity on the toner can be precisely controlled. In addition, after the controlling process, the dielectric loss tangent tan $\delta$ of the toner can be reduced through the drop in toner temperature. The toner then exhibits an excellent charge retention capability during development and transfer as a result.

The methods used to measure the values of the various properties are described in the following.

Method for Measuring Weight-Average Particle Diameter (D4) and Number-Average Particle Diameter (D1)

The weight-average particle diameter (D4) and number-average particle diameter (D1) of the toner, toner particle, and toner base particle (also referred to below as, for example, toner) is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the, e.g., toner, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing, e.g., dispersed toner, is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Dielectric Loss Tangent Tan δ of Toner

The dielectric loss tangent tan δ of the toner is measured by impedance measurement using an electrode cell for liquid/powder applications.

The following are used as the measurement apparatus: an SH-241 thermostatted chamber from the ESPEC CORP., and an SR-CIR-C electrode cell for liquid/powder applications and a high-voltage impedance measurement system, both from the TOYO Corporation.

The SR-CIR-C electrode cell for liquid/powder applications is used for the toner measurement tool. The SR-CIR-C electrode cell for liquid/powder applications is composed of an outwardly projecting cylindrical upper electrode (12 mmØ) and an inwardly recessed cylindrical lower electrode (inner diameter of 14.5 mmØ), and is a cell that carries out pressurization adjustment through a screwdown system. It has a structure that has an empty cell capacitance of approximately 2 pF and can carry out measurements at temperatures from 0° C. to 100° C. and DC to 3 MHz.

An RTD60CN torque screwdriver (Tohnichi Mfg. Co., Ltd.) and a 6.35 mm square bit are used for the torque screwdriver used for pressure control at the set pressure kit, and a structure is set up that enables control of the tightening torque to 60 cN·m.

When a powder is enclosed in the electrode cell for liquid/powder applications, a powder sample that is pressurized and a powder sample for which pressurization control is not possible are present in a mixed state in the gap (about 1.25 to 1.6 mm) between the upper electrode and the lower electrode, and as a consequence two elementary processes having different dielectric relaxation characteristics coexist. The frequency dependence of the dielectric loss tangent tan δ may therefore be expected to have a maximum value, and the conductance (conductivity) G at the frequency at the maximum value of tan δ is regarded as representing the volumetric resistance component of the pressurized toner.

Measurement of the AC electrical characteristics is performed by impedance measurement using a high-voltage impedance system from the TOYO Corporation.

The high-voltage impedance measurement system is constructed from a 126096W dielectric impedance measurement system from Solartron, consisting of a 1260 impedance analyzer and a 1296 dielectric interface, and also from a Model 2220 high-voltage amplifier from Trek, Inc. for the DC amplifier, an HVA800 high-speed amplifier from the TOYO Corporation for the AC amplifier, a 6792 high-voltage AC/DC interface from the TOYO Corporation for carrying out high-voltage control of the AC/DC signal, and a 6796 reference box from the TOYO Corporation for monitoring the high-voltage signal and capacitance correction. The impedance measurement is performed using SMaRT Ver. 3.31 from Solartron as the control software.

An NCT-I3/1.4 kVA "Noisecuttrans" from DENKEN-SEIKI Research Institute Co., Ltd. is used as the noise suppression means for the commercial power supply.

The toner measurement conditions are External Mode, which carries out correction processing using an external capacitance, and an AC level of 7 Vrms, a DC bias of 0 V, and a frequency sweep of 100 kHz to 0.0215 Hz (12 points/decade).

The following settings are also entered for each frequency sweep in order to shorten the measurement time.

100 kHz to 10 kHz frequency sweep: measurement delay cycles=1000, measurement scan time=768 cycles 10 kHz to 1 kHz frequency sweep: measurement delay cycles=500, measurement scan time=512 cycles 1 kHz to 100 Hz frequency sweep: measurement delay cycles=20, measurement scan time=384 cycles 100 Hz to 10 Hz frequency sweep: measurement delay cycles=10, measurement scan time=64 cycles 10 Hz to 1 Hz frequency sweep: measurement delay cycles=1, measurement scan time=16 cycles 1 Hz to 0.1 Hz frequency sweep: measurement delay cycles=1, measurement scan time=8 cycles 0.1 Hz to 0.0215 Hz frequency sweep: measurement delay cycles=1, measurement scan time=4 cycles The impedance characteristics, which are AC electrical characteristics, are measured using these measurement conditions.

The temperature dependence of the AC electrical characteristics, e.g., the capacitance C, conductance (conductivity) G, and so forth, are obtained from the impedance characteristics of the sample and the admittance characteristics based on the assumption of an RC parallel circuit parameter model.

The specific procedures for sample fabrication and measurement are as follows.

(1) 0.15 g of the toner (powder) is introduced into the inwardly recessed cylindrical lower electrode of the SR-CIR-C electrode cell for liquid/powder applications.

(2) The toner (powder) is subjected to a smoothing treatment by sliding the lower electrode over a flat plate of, e.g., marble, in a circle or figure 8.

(3) The upper electrode (screwdown type) is manually tightened. Pressurization to a pressure of 1,000 kPa is applied using the torque screwdriver.

(4) The sample (SR-CIR-C electrode cell for liquid/powder applications) is placed in the thermostatted chamber controlled to a temperature of 30° C. and a humidity of 50% RH.

(5) The impedance is measured after 20 minutes have passed. The value of the dielectric loss tangent measured at a frequency of 10 kHz from the impedance obtained here is used as tan δ30° C.(1).

(6) The thermostatted chamber is ramped up to a temperature of 50° C. and a humidity of 50% RH (ramp speed=1 minute per 5° C.), and the impedance is measured after 20 minutes have passed. The value of the dielectric loss tangent measured at a frequency of 10 kHz from the impedance obtained here is used as tan δ50° C.(1). The impedance measurement takes from 60 to 80 minutes.

(7) The thermostatted chamber is cooled to a temperature of 30° C. (cooling speed=1 minute per 5° C.), and the impedance is measured after 20 minutes have passed. The value of the dielectric loss tangent measured at a frequency of 10 kHz from the impedance obtained here is used as tan δ30° C.(2). The impedance measurement takes from 60 to 80 minutes.

The dielectric constant of the toner is taken to be the value of the dielectric constant of the toner at a frequency of 10 kHz, as obtained by the impedance measurement using the measurement conditions given above in the environment having a temperature of 30° C. and a relative humidity of 50% RH, after the impedance measurement in the environment having a temperature of 50° C. and a relative humidity of 50% RH.

Observation of Toner Surface by STEM-EDS

A section containing the outermost surface of the toner is observed with a scanning transmission electron microscope (STEM) using the following method.

Figure 3:
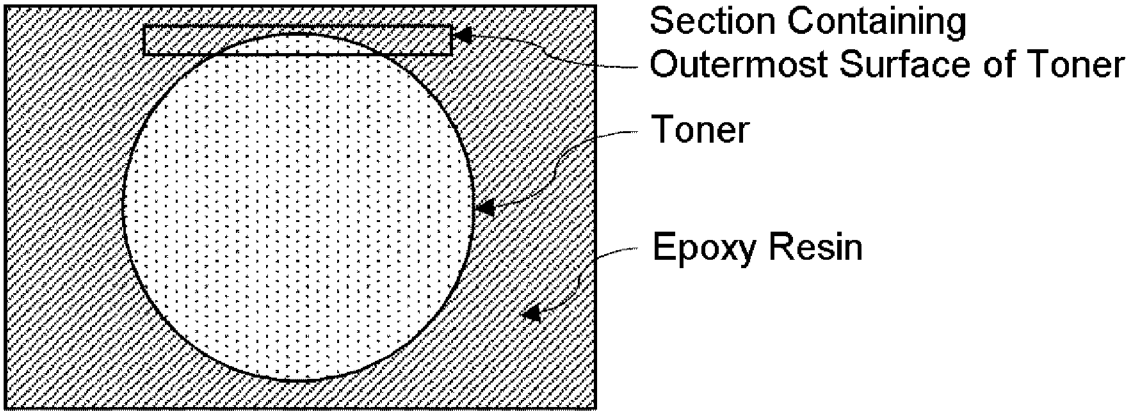
FIG. 3 is a schematic diagram of slicing to give a thin-section sample.

The toner is first thoroughly dispersed in a normal temperature-curable epoxy resin followed by curing for 2 days in a 40° C. atmosphere. A 50 nm-thick thin-section sample containing the outermost surface of the toner is sliced from the resulting cured material using a microtome equipped with a diamond blade (EM UC7, Leica) (FIG. 3).

The outermost surface of the toner is observed at a magnification of 100,000× using this sample and a STEM (Model JEM2800, JEOL Ltd.) and conditions of an acceleration voltage of 200 V and an electron beam probe size of 1 mm.

The constituent elements of the obtained outermost surface of the toner are then analyzed using energy-dispersive X-ray spectroscopy (EDS) and EDS mapping images (256×256 pixels (2.2 nm/pixel), number of scans=200) are produced.

When a metal element-derived signal is observed at the toner surface in the obtained EDS mapping image and a particle is observed at the same location in the STEM image, this particle is then scored as a metal compound fine particle A. The long diameter is measured on 30 randomly selected metal compound fine particles A, and the resulting arithmetic average value is used as the number-average particle diameter DA of the metal compound fine particle A.

When a particle having a particle diameter of from 50 nm to 500 nm is present at the toner particle surface in the STEM image, such a particle is scored as a fine particle B1. The long diameter is measured on 30 randomly selected fine particles B1, and the resulting arithmetic average value is used as the number-average particle diameter DB of the fine particle B1. In addition, the areas of all the fine particles B1 in the STEM image are measured, and the total value of these is used for $SB_{all}$. The surface area S of the entire toner particle is also measured using the same conditions. The coverage ratio by the fine particle B1 is calculated using this surface area S, $SB_{all}$, and the following formula.

$$\text{coverage ratio } (\%)=(SB_{all}/S)\times 100$$

These measurements are performed on 20 toner particles, and the arithmetic average value of the coverage ratios for the 20 particles is used in the present disclosure as the coverage ratio of the toner particle by fine particle B1.

When, in the obtained EDS mapping image, a silicon-derived signal is observed at the same location as a fine particle B1 and this signal is confirmed to originate with silica using the Method for Identifying Silicon Compounds described below, this signal is then taken to be an image of a silica fine particle. Similarly, when, in the obtained EDS mapping image, a silicon-derived signal is in the same location as a fine particle B1 and this signal is confirmed to originate with an organosilicon polymer using the Method for Identifying Silicon Compounds described below, this signal is then taken to be an image of an organosilicon polymer fine particle.

Method for Calculating Number-Average Value of Protrusion Height H and Coverage Ratio by Protruded Portions, Using STEM-EDS The toner cross section is observed with a scanning transmission electron microscope (STEM) using the following method.

The toner is first thoroughly dispersed in a normal temperature-curable epoxy resin followed by curing for 2 days in a 40° C. atmosphere.

50 nm-thick thin section samples are sliced from the resulting cured material using a microtome equipped with a diamond blade (EM UC7, Leica).

The toner cross section is observed by enlarging this sample by 100,000× using a STEM (Model JEM2800, JEOL Ltd.) and conditions of an acceleration voltage of 200 V and an electron beam probe size of 1 mm. At this time, toner cross sections are selected that have a largest diameter that is 0.9-times to 1.1-times the number-average particle diameter (D1) provided by measurement of the same toner using the method described below for measuring the number-average particle diameter (D1) of the toner.

The protruded portions are measured by carrying out image analysis on the obtained STEM image using image analysis software (Image J (available from https://imagej.nih.gov/ij/)). This measurement is performed on 30 protruded portions selected at random from the STEM image.

First, a line is drawn along the circumference of the toner base particle using the line drawing tool (select Segmented line on the Straight tab). In regions where the protruded portion is buried in the toner base particle, the lines are smoothly connected as if this burial did not occur.

Conversion into a flat image is carried out based on this line (Selection on the Edit tab is selected, the line width in properties is changed to 500 pixels, and Selection on the Edit tab is then selected and Straightener is carried out).

The following measurements are performed on one protruded portion in this flat image.

The length of the line along the circumference for the segment where the protruded portion and the toner base particle form a continuous interface is made the protrusion width w.

The protrusion diameter D is taken to be the maximum length of the protruded portion in the direction perpendicular to the protrusion width w, and the protrusion height H is taken to be the length, in the line segment that forms the protrusion diameter D, from the apex of the protruded portion to the line along the circumference.

This measurement is carried out on 30 randomly selected protruded portions, and the number-average value of the protrusion height H is taken to be the arithmetic average value of the individual measurement values.

The circumference length L of the toner base particle is measured under the same conditions. The total value $W_{all}$ of the protrusion widths w of all the protruded portions observed on the toner base particle is determined at the same time. The coverage ratio by the protruded portions is calculated using this circumference length L, $W_{all}$, and the following formula.

$$\text{Coverage ratio }(\%)=(W_{all}/L)\times 100$$

These measurements are performed on 20 toner particles, and the arithmetic average value of the coverage ratios for the 20 particles is used in the present disclosure as the coverage ratio of the toner base particle by protruded portion B2.

The protruded portion is preferably present in the STEM image in a semicircular shape. This semicircular shape may be any shape having a curved surface close to a semicircular shape and includes approximately semicircular shapes. For example, semi-true circular shapes and semi-elliptical shapes are also included as semicircular shapes. The semicircular shape includes semicircular shapes provided by sectioning with a straight line that passes through the center of the circle, i.e., half-circle shapes. The semicircular shape also includes semicircular shapes provided by sectioning with a straight line that does not pass through the center of the circle, i.e., shapes larger than a half circle and shapes smaller than a half circle.

The constituent elements of the obtained toner cross section are then analyzed using energy-dispersive X-ray spectroscopy (EDS) and EDS mapping images (256×256 pixels (2.2 nm/pixel), number of scans=200) are produced.

When, in the resulting EDS mapping image, a signal deriving from the element silicon is observed at the toner base particle surface and this signal is confirmed by the Method for Identifying Silicon Compounds, see below, to derive from organosilicon polymer, this signal is then taken to be an organosilicon polymer image.

Method for Identifying Silicon Compounds

Organosilicon polymer is identified by comparing the ratio between the element contents (atomic %) for Si and O (Si/O ratio) with standards.

EDS analysis is carried out using the conditions described in Method for Calculating Number-Average Value of Protrusion Height H and Coverage Ratio by Protruded Portions, Using STEM-EDS on a standard for the organosilicon polymer and a standard for the silica fine particles, and the element contents (atomic %) for Si and O are obtained for each.

The Si/O ratio for the organosilicon polymer is designated A, and the Si/O ratio for the silica fine particles is designated B. Measurement conditions are selected whereby A is significantly larger than B.

Specifically, the measurement is carried out ten times on each standard under the same conditions, and A and B and their respective arithmetic averages are obtained. Measurement conditions are selected whereby the obtained average values provide A/B>1.1.

When the Si/O ratio of a region where Si has been detected in the EDS image is on the A side of [(A+B)/2], that region is scored as organosilicon polymer. Conversely, when the Si/O ratio is on the B side from [(A+B)/2], that region is scored as silica.

Tospearl 120A (Momentive Performance Materials Japan LLC) is used as the standard for organosilicon polymer particles, and HDK V15 (Asahi Kasei Corporation) is used as the standard for silica fine particles.

Method for Calculating Percentage Occurrence of Metal Elements Using X-ray Photoelectron Spectroscopy The percentage occurrence of metal elements is calculated from measurement of the toner under the following conditions.

Measurement instrumentation: Quantum 2000 (Ulvac-Phi, Incorporated) x-ray photoelectron spectrometer
X-ray source: monochrome Al Kα
X-ray setting: 100 μmØ (25 W (15 kV))
Photoelectron take-off angle: 45°
Neutralizing conditions: use of both neutralizing gun and ion gun
Analysis region: 300×200 μm
Pass energy: 58.70 eV
Step size: 0.125 eV
Analysis software: MultiPack (PHI)

The use of Ti as the metal element is taken up as an example in the following, and the determination method by analysis of the quantitative value for the metal element is described. First, the peak originating with the C—C bond of the carbon is orbital is corrected to 285 eV. Then, using the sensitivity factor provided by Ulvac-Phi, Inc., the amount of Ti originating with the element Ti is calculated with reference to the total amount of the constituent elements using the peak area originating with the Ti 2p orbital, for which the peak top is detected at 452 to 468 eV, and this value is used as the quantitative value M1 (atomic %) for the element Ti at the toner surface.

Method for Measuring Glass Transition Temperature (Tg)

The glass transition temperature (Tg) of, e.g., the binder resin and toner, is measured using a differential scanning calorimeter (also referred to below as "DSC").

Measurement of the glass transition temperature is performed by DSC in accordance with JIS K 7121 (international standard: ASTM D 3418-82).

A "Q1000" (TA Instruments) is used in this measurement, using the melting points of indium and zinc for temperature correction of the instrument detection section and using the heat of fusion of indium for correction of the amount of heat.

For the measurement, a 10 mg measurement sample is exactly weighed out and this is introduced into an aluminum pan; an empty aluminum pan is used for reference.

In a first ramp-up process, the measurement is run while heating the measurement sample from 20° C. to 200° C. at 10° C./min. This is followed by holding for 10 minutes at 200° C. and then the execution of a cooling process of cooling from 200° C. to 20° C. at 10° C./min.

After then holding for 10 minutes at 20° C., reheating from 20° C. to 200° C. at 10° C./min is carried out in a second ramp up process.

The glass transition temperature here is the midpoint glass transition temperature. Using the DSC curve from the second ramp-up process as obtained under the measurement conditions described above, the glass transition temperature (Tg) is taken to be the temperature at the point where the curve segment for the stepwise change at the glass transition temperature intersects with the straight line that is equidistant, in the direction of the vertical axis, from the straight lines that extend the base lines on the low temperature side and high temperature side of the stepwise change.

When the toner particle has been produced, for example, in an aqueous medium, a portion is taken as a sample and the DSC measurement is run thereon after washing out other than the toner particle and drying.

Dynamic Viscoelastic Measurement on Toner

An "ARES" (TA Instruments) rotational flat plate rheometer is used as the measurement instrument.

Using a tablet molder and operating in a 25° C. environment, the toner is compression molded into a disk having a diameter of 7.9 mm and a thickness of 2.0±0.3 mm to provide a sample that is used as the measurement sample.

This sample is installed in the parallel plates and the temperature is raised from room temperature (25° C.) to the viscoelastic measurement start temperature (50° C.) and measurement using the following conditions is started.

The measurement conditions are as follows.

(1) The sample is set so as to provide an initial normal force of 0.

(2) Parallel plates with a diameter of 7.9 mm are used.

(3) A frequency (Frequency) of 1.0 Hz is used.

(4) The initial value of the applied strain (Strain) is set to 0.1%.

(5) The measurement is carried out at from 50° C. to 160° C. at a ramp rate (Ramp Rate) of 2.0° C./min and a sampling frequency of 1 time/° C.

The measurement is run using the following setting conditions for automatic adjustment mode.

The measurement is run in automatic strain adjustment mode (Auto Strain).

(6) The maximum strain (Max Applied Strain) is set to 20.0%.

(7) The maximum torque (Max Allowed Torque) is set to 200.0 g·cm and the minimum torque (Min Allowed Torque) is set to 0.2 g·cm.

(8) The strain adjustment (Strain Adjustment) is set to 20.0% of Current Strain. Automatic tension adjustment mode (Auto Tension) is adopted for the measurement.

(9) The automatic tension direction (Auto Tension Direction) is set to compression (Compression).

(10) The initial static force (Initial Static Force) is set to 10.0 g and the automatic tension sensitivity (Auto Tension Sensitivity) is set to 40.0 g.

(11) For the automatic tension (Auto Tension) operating condition, the sample modulus (Sample Modulus) is equal to or greater than $1.0\times10^3$ (Pa).

The temperature at which the storage elastic modulus G' is $1.0\times10^5$ Pa is read from these measurement results and this value is used as Ta (° C.).

Method for Detecting Polyhydric Acid Metal Salt

The polyhydric acid metal salt at the toner surface is detected using the following method and time-of-flight secondary ion mass spectrometry (TOF-SIMS).

The toner sample is analyzed using the following conditions and TOF-SIMS (TRIFT IV, Ulvac-Phi, Inc.).

Primary ion species: gold ion ($Au^+$)

Primary ion current value: 2 pA

Analyzed area: 300×300 $\mu m^2$

Number of pixels: 256×256 pixels

Analysis time: 3 min

Repetition frequency: 8.2 kHz

Charge neutralization: ON

Secondary ion polarity: positive

Secondary ion mass range: m/z 0.5 to 1850

Sample substrate: indium

Polyhydric acid metal salt is present at the toner particle surface when, in analysis under the aforementioned conditions, a peak originating with a secondary ion containing the metal ion and polyhydric acid ion is detected (for example, in the case of titanium phosphate, $TiPO_3$ (m/z 127), $TiP_2O_5$ (m/z 207), and so forth).

Method for Measuring Average Circularity

The average circularity of the toner and toner particle is measured using an "FPIA-3000" (Sysmex Corporation), a flow particle image analyzer, under the measurement and analysis conditions during the calibration work.

The specific measurement procedure is as follows.

First, 20 mL of deionized water—from which, e.g., solid impurities, have been removed in advance—is introduced into a glass vessel. To this is added as dispersing agent about 0.2 mL of a dilution prepared by the about three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

0.02 g of the measurement sample is added and a dispersion treatment is carried out for 2 minutes using an ultrasound disperser to provide a dispersion to be used for the measurement. Cooling is carried out as appropriate during this process in order to have the temperature of the dispersion be from 10° C. to 40° C.

Using a benchtop ultrasound cleaner/disperser that has an oscillation frequency of 50 kHz and an electrical output of 150 W (for example, the "VS-150" (Velvo-Clear Co., Ltd.)) as the ultrasound disperser, a predetermined amount of deionized water is introduced into the water tank and approximately 2 mL of Contaminon N is added to the water tank.

The flow particle image analyzer fitted with a "UPlanApro" objective lens (10×, numerical aperture: 0.40) is used for the measurement, and "PSE-900A" (Sysmex Corporation) particle sheath is used for the sheath solution.

The dispersion prepared according to the procedure described above is introduced into the flow particle image analyzer and 3,000 of the toner particles are measured according to total count mode in HPF measurement mode.

The average circularity of the toner or toner particle is determined with the binarization threshold value during particle analysis set at 85% and with the analyzed particle diameter limited to a circle-equivalent diameter from 1.985 μm to less than 39.69 μm.

For this measurement, automatic focal point adjustment is performed prior to the start of the measurement using reference latex particles (for example, a dilution with deionized water of "RESEARCH AND TEST PARTICLES Latex Microsphere Suspensions 5200A", Duke Scientific Corporation). After that, focus point adjustment is performed every two hours from the start of measurement.

Measurement of Volume Resistivity of Polyhydric Acid Metal Salt

The volume resistivity of the polyhydric acid metal salt is measured as follows.

A Model 6430 Sub-Femtoamp Remote SourceMeter (Keithley Instruments) is used as the instrumentation. An SH2-Z 4-probe measurement-enabling sample holder (Bio-Logic) is connected to the FORCE terminal of this instrument; 0.20 g of the metal compound is loaded in the electrode section; and the distance between the electrodes is measured with a load of 123.7 kgf applied using a torque wrench.

The resistance is measured after the application of a voltage of 20 V for 1 minute to the sample, and the volume resistivity is calculated using the following formula.

$$\text{Volume resistivity } (\Omega\cdot\text{m}) = R \times S/L$$

(R: resistance value (Ω), L: distance between electrodes (m), S: electrode area ($m^2$))

With regard to the method for isolating the metal compound fine particle A or fine particle B1 from the toner, the toner is dispersed in a solvent, e.g., chloroform, and these fine particles can then be isolated by utilizing specific gravity differences by, for example, centrifugal separation. When the metal compound fine particle A or fine particle B1 can be acquired as such, these fine particles may also be measured as such.

Identification of Organosilicon Polymer Substructures by NMR

The following method is used to confirm the structure represented by formula (I) in the organosilicon polymer contained in the toner particle.

The hydrocarbon group represented by R in formula (I) is checked using $^{13}$C-NMR.

Measurement Conditions for $^{13}$C-NMR (Solid State)

- Instrument: JNM-ECX500II, JEOL RESONANCE
- Sample tube: 3.2 mmØ
- Sample: tetrahydrofuran-insoluble matter of the toner particle for NMR measurement, 150 mg
- Measurement temperature: room temperature
- Pulse mode: CP/MAS
- Measurement nucleus frequency: 123.25 MHz ($^{13}$C)
- Reference substance: adamantane (external reference: 29.5 ppm)
- Sample spinning rate: 20 kHz
- Contact time: 2 ms
- Delay time: 2 s
- Number of scans: 1024

The hydrocarbon group represented by R in formula (1) was confirmed by this method through the presence/absence of a signal originating with, for example, a silicon atom-bonded methyl group ($Si—CH_3$), ethyl group ($Si—C_2H_5$), propyl group ($Si—C_3H_7$), butyl group ($Si—C_4H_9$), pentyl group ($Si—C_5H_{11}$), hexyl group ($Si—C_6H_{13}$), or phenyl group ($Si—C_6H_5$).

In addition, the presence/absence, or the proportion, of the structure represented by $R—SiO_{3/2}$ (T3 unit structure) in the organosilicon polymer is measured and determined using solid-state $^{29}$Si-NMR.

With solid-state $^{29}$Si-NMR, peaks are detected in different shift regions depending on the structure of the functional group bonded to the Si in the constituent compounds of the organosilicon polymer.

The individual peak positions can establish the structures bonded to Si through identification using a reference sample. In addition, the abundance ratio of the individual constituent compounds can be calculated from the obtained peak areas. The percentage for the peak area for the T3 unit structure with reference to the total peak area can be determined by calculation.

The specific measurement conditions for the solid-state $^{29}$Si-NMR are as follows.

- Instrument: JNM-ECX5002 (JEOL RESONANCE)
- Temperature: room temperature
- Measurement method: DDMAS method, $^{29}$Si, 45°
- Sample tube: zirconia 3.2 mmØ
- Sample: filled as a powder into the sample tube
- Sample spinning rate: 10 kHz
- Relaxation delay: 180 s
- Scans: 2,000

After the measurement, peak separation into the following structure X1, structure X2, structure X3, and structure X4 for the sample or organosilicon polymer is performed by curve fitting multiple silane components having different substituents and bonding groups, and the respective peak areas are calculated.

The following structure X3 corresponds to the T3 unit structure.

Structure X1: $(Ri)(Rj)(Rk)SiO_{1/2}$ (A1)

Structure X2: $(Rg)(Rh)Si(O_{1/2})_2$ (A2)

Structure X3: $RmSi(O_{1/2})_3$ (A3)

Structure X4: $Si(O_{1/2})_4$ (A4)

Structure X1:

(A1)

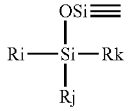

Structure X2:

(A2)

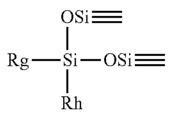

-continued

Structure X3:

(A3)

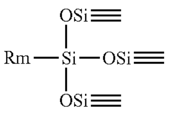

Structure X4:

(A4)

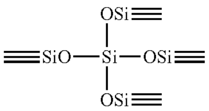

The Ri, Rj, Rk, Rg, Rh, and Rm in formulas (A1), (A2), and (A3) represent a silicon-bonded organic group, e.g., a hydrocarbon group having from 1 to 6 carbons, halogen atom, hydroxy group, acetoxy group, or alkoxy group.

When the structure must be elucidated in greater detail, identification may be performed using the measurement results from the aforementioned $^{13}$C-NMR and $^{29}$Si-NMR in combination with the measurement results from $^{1}$H-NMR.

EXAMPLES

The present invention is more specifically described in the production examples and examples provided below. However, these in no way limit the present invention. Unless specifically indicated otherwise, the "parts" and "%" in the production examples and examples are on a mass basis in all instances.

Organosilicon Compound Solution Production Example

| | |
|---|---|
| deionized water | 70.0 parts |
| methyltriethoxysilane | 30.0 parts |

These materials were weighed into a 200-mL beaker and the pH was adjusted to 3.5 using 10% hydrochloric acid. This was followed by stirring for 1.0 hour while heating to 60° C. on a water bath to produce an organosilicon compound solution.

Production Example for Polyhydric Acid Metal Salt Fine Particles

| | |
|---|---|
| deionized water | 100.0 parts |
| sodium phosphate (dodecahydrate) | 8.5 parts |

The preceding were mixed and 60.0 parts of ammonium zirconium lactate (ZC-300, Matsumoto Fine Chemical Co., Ltd.) (corresponds to 7.2 parts as ammonium zirconium lactate) was then added while stirring at 10,000 rpm using a T. K. Homomixer (Tokushu Kika Kogyo Co., Ltd.). The pH was adjusted to 7.0 by the addition of 1 mol/L hydrochloric acid. The temperature was adjusted to 75° C. and a reaction was run for 1 hour while maintaining the stirring.

The solids fraction was subsequently recovered by centrifugal separation. Ions such as sodium and so forth were removed by then carrying out the following sequence three times: redispersion in deionized water and recovery of the solids fraction by centrifugal separation. This was followed by redispersion in deionized water and drying by spray drying to obtain fine particles of a zirconium phosphate compound having a number-average particle diameter of 22 nm. The obtained zirconium phosphate compound fine particles were used as the metal compound fine particle A-4 indicated in Table 1.

Organosilicon Polymer Fine Particles Production Example

First Step 360 parts of water was introduced into a reaction vessel fitted with a thermometer and a stirrer, and 15 parts of hydrochloric acid having a concentration of 5.0 mass % was added to provide a uniform solution. While stirring this at a temperature of 25° C., 136.0 parts of methyltrimethoxysilane was added, stirring was performed for 5 hours, and filtration was subsequently carried out to obtain a transparent reaction solution containing a silanol compound or partial condensate thereof.

Second Step 440 parts of water was introduced into a reaction vessel fitted with a thermometer, stirrer, and dropwise addition device and 17 parts of aqueous ammonia having a concentration of 10.0 mass % was added to provide a uniform solution. While stirring this at a temperature of 35° C., 100 parts of the reaction solution obtained in the first step was added dropwise over 0.50 hour, and stirring was performed for 6 hours to obtain a suspension. The resulting suspension was processed with a centrifugal separator and the fine particles were sedimented and withdrawn and were dried for 24 hours with a dryer at a temperature of 200° C. to obtain organosilicon polymer fine particles having a number-average particle diameter of 100 nm. The obtained organosilicon polymer fine particles were used as the fine particle B1-2 indicated in Table 1.

Metal Compound Fine Particle A and Fine Particle B1

The fine particles respectively indicated in Table 1 below were used as metal compound fine particle A and fine particle B1.

TABLE 1

| | Structure | Surface treatment | Number-average particle diameter (nm) | Volume resistivity (Ω · m) |
|---|---|---|---|---|
| Metal compound fine particle A-1 | Titanium oxide (rutile) | Treatment with i-butyltriethoxysilane | 33 | $1.8 \times 10^{8}$ |
| Metal compound fine particle A-2 | Titanium oxide (anatase) | Treatment with i-butyltriethoxysilane | 6 | $1.6 \times 10^{7}$ |

TABLE 1-continued

| | Structure | Surface treatment | Number-average particle diameter (nm) | Volume resistivity (Ω · m) |
|---|---|---|---|---|
| Metal compound fine particle A-3 | Aluminum oxide | Treatment with i-butyltriethoxysilane | 15 | $2.4 \times 10^{7}$ |
| Metal compound fine particle A-4 | Polyhydric acid metal salt fine particle (zirconium phosphate) | None | 22 | $1.2 \times 10^{5}$ |
| Fine particle B1-1 | Silicon dioxide (produced by sol-gel method) | Treatment with octyltriethoxysilane | 100 | $1.0 \times 10^{13}$ |
| Fine particle B1-2 | Organosilicon polymer fine particle | None | 100 | $5.1 \times 10^{13}$ |
| Hydrophobic silica fine particle | Silicon dioxide (produced by vapor phase method) | Treatment with hexamethyldisilazane | 12 | $1.0 \times 10^{15}$ |

Toner Base Particle Dispersion 1 Production Example 11.2 parts of sodium phosphate (dodecahydrate) was introduced into 390.0 parts of deionized water in a reactor and the temperature was held at 65° C. for 1.0 hour while purging with nitrogen. Stirring was begun at 12000 rpm using a T. K. Homomixer (Tokushu Kika Kogyo Co., Ltd.). While maintaining the stirring, an aqueous calcium chloride solution of 7.4 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0, thus yielding aqueous medium 1.

Preparation of Polymerizable Monomer Composition

| | |
|---|---|
| styrene | 60.0 parts |
| C.I. Pigment Blue 15:3 | 6.5 parts |

These materials were introduced into an attritor (Nippon Coke & Engineering Co., Ltd.) and dispersion was carried out for 5.0 hours at 220 rpm using zirconia particles with a diameter of 1.7 mm; this was followed by the removal of the zirconia particles to provide a colorant dispersion in which the pigment was dispersed.

The following materials were then added to this colorant dispersion.

| | |
|---|---|
| styrene | 15.0 parts |
| n-butyl acrylate | 25.0 parts |
| hexanediol diacrylate | 0.5 parts |
| polyester resin (condensation polymer of terephthalic acid and the 2 mol adduct of propylene oxide on bisphenol A, weight-average molecular weight Mw = 10,000, acid value = 8.2 mg KOH/g) | 5.0 parts |
| release agent: HNP9 (melting point: 76° C., Nippon Seiro Co., Ltd.) | 5.0 parts |
| plasticizer: ethylene glycol distearate | 15.0 parts |

This material was then held at 65° C. and a polymerizable monomer composition was prepared by dissolving and dispersing to uniformity at 500 rpm using a T. K. Homomixer.

Granulation Step

While holding the temperature of aqueous medium 1 at 70° C. and the stirrer rotation rate at 12500 rpm, the polymerizable monomer composition was introduced into the aqueous medium 1 and 8.0 parts of the polymerization initiator t-butyl peroxypivalate was added. Granulation was performed for 10 minutes while maintaining 12500 rpm with the stirrer.

Polymerization Step

The high-speed stirrer was replaced with a stirrer equipped with a propeller impeller and polymerization was carried out for 5.0 hours while maintaining 70° C. and stirring at 200 rpm; the temperature was then raised to 85° C. and a polymerization reaction was run by heating for 2.0 hours. The residual monomer was removed by raising the temperature to 98° C. and heating for 3.0 hours. This was followed by lowering the temperature to 55° C. and holding at 55° C. for 5.0 hours while maintaining the stirring. The temperature was then reduced to 25° C. Deionized water was added to adjust the toner base particle concentration in the dispersion to 30.0%, thus yielding toner base particle dispersion 1 in which toner base particle 1 was dispersed.

Example of Production of Phosphate Salt-Containing Aqueous Medium

The aforementioned aqueous medium 1 was used as a phosphate salt-containing aqueous medium.

Toner Particle 1 Production Example

A toner base particle dispersion was prepared proceeding as in the Toner Base Particle Dispersion 1 Production Example. The pH of the obtained dispersion was adjusted to 1.5 using 1 mol/L hydrochloric acid and stirring was performed for 1.0 hour, followed by filtration while washing with deionized water and drying. The obtained powder was classified using a wind force classifier to obtain toner particle 1.

Toner particle 1 had a number-average particle diameter (D1) of 6.2 μm, a weight-average particle diameter (D4) of 6.7 μm, an average circularity of 0.985, and a volume resistivity of $3.5\times10^{13}$ (Ω·m).

Toner Particle 2 Production Example

The following materials were weighed out and mixed and dissolved.

| | |
|---|---|
| styrene | 70.0 parts |
| n-butyl acrylate | 25.1 parts |

-continued

| | |
|---|---|
| acrylic acid | 1.3 parts |
| hexanediol diacrylate | 0.4 parts |
| n-lauryl mercaptan | 3.2 parts |

A 10% aqueous solution of Neogen R K (Dai-ichi Kogyo Seiyaku Co., Ltd.) was added to this solution and dispersion was carried out. While gently stirring for 10 minutes, an aqueous solution of 0.15 parts of potassium persulfate dissolved in 10.0 parts of deionized water was also added.

Nitrogen substitution was performed followed by emulsion polymerization for 6.0 hours at a temperature of 70° C. After completion of the polymerization, the reaction solution was cooled to room temperature and deionized water was added to obtain a resin particle dispersion having a solids concentration of 12.5% and a number-average particle diameter of 0.2 μm.

The following materials were weighed out and mixed.

| | |
|---|---|
| release agent: HNP9 (melting point: 76° C., Nippon Seiro Co., Ltd.) | 15.0 parts |
| plasticizer: ethylene glycol distearate | 45.0 parts |
| Neogen RK ionic surfactant (Dai-ichi Kogyo Seiyaku Co., Ltd.) | 2.0 parts |
| deionized water | 240.0 parts |

The preceding was heated to 100° C. and was thoroughly dispersed using an Ultra-Turrax T50 from IKA. This was followed by heating to 115° C. and a 1-hour dispersion treatment using a Gaulin pressure ejection homogenizer to give a release agent particle dispersion having a solids fraction of 20% and a volume-average particle diameter of 150 nm.

The following materials were weighed out and mixed.

| | |
|---|---|
| C.I. Pigment Blue 15:3 | 45.0 parts |
| Neogen RK | 5.0 parts |
| deionized water | 190.0 parts |

These components were mixed and were dispersed for 10 minutes using a homogenizer (Ultra-Turrax, IKA). This was followed by a dispersion treatment for 20 minutes at a pressure of 250 MPa using an Ultimizer (a countercollision wet pulverizer, Sugino Machine Limited) to obtain a colorant particle dispersion having a solids fraction of 20% and a volume-average particle diameter for the colorant particles of 120 nm.

| | |
|---|---|
| resin particle dispersion | 160.0 parts |
| release agent particle dispersion | 33.4 parts |
| colorant particle dispersion | 14.4 parts |
| magnesium sulfate | 0.3 parts |

These materials were dispersed using a homogenizer (IKA), followed by heating to 65° C. while stirring. After stirring for 1.0 hour at 65° C., observation with an optical microscope confirmed the formation of aggregate particles having a number-average particle diameter of 6.0 μm. After the addition of 2.5 parts of Neogen R K (Dai-ichi Kogyo Seiyaku Co., Ltd.), the temperature was raised to 80° C. and stirring was performed for 2.0 hours. This was followed by cooling to 55° C. and holding the 55° C. for 5.0 hours while maintaining the stirring. Cooling to 25° C. was then performed to obtain coalesced colored resin particles.

The solid obtained by filtration and separation was washed by stirring for 1.0 hour in 2500.0 parts of deionized water. This colored resin particle-containing dispersion was filtered followed by drying to yield toner base particle 2. This toner base particle 2 was used as toner particle 2.

Toner particle 2 had a number-average particle diameter (D1) of 6.2 μm, a weight-average particle diameter (D4) of 6.7 μm, an average circularity of 0.955, and a volume resistivity of $2.9\times10^{13}$ (Ω·m).

Toner Particle 3 Production Example

| | |
|---|---|
| binder resin (styrene-n-butyl acrylate copolymer): [Styrene-n-butyl acrylate copolymer having a mass ratio of 70:30, a peak molecular weight (Mp) of 22,000, a weight-average molecular weight (Mw) of 35,000, and Mw/Mn = 2.4 where Mn is the number-average molecular weight.] | 100.0 parts |
| C.I. Pigment Blue 15: | 6.5 parts |
| amorphous polyester resin: (condensate of terephthalic acid and propylene oxide-modified bisphenol A, weight-average molecular weight (Mw) = 7,800, glass transition temperature (Tg) = 70° C., acid value = 8.0 mg KOH/g) | 5.0 parts |
| release agent: HNP9 (melting point: 76° C., Nippon Seiro Co., Ltd.) | 5.0 parts |
| plasticizer: ethylene glycol distearate | 15.0 parts |

These materials were pre-mixed using an FM mixer (Nippon Coke & Engineering Co., Ltd.) followed by melt-kneading with a twin-screw kneader (Model PCM-30, Ikegai Ironworks Corporation) to obtain a kneaded material. The obtained kneaded material was cooled and coarsely pulverized using a hammer mill (Hosokawa Micron Corporation) and then pulverized using a mechanical pulverizer (T-250, Turbo Kogyo Co., Ltd.) to obtain a finely pulverized powder. The obtained finely pulverized powder was classified using a Coanda effect-based multi-grade classifier (Model EJ-L-3, Nittetsu Mining Co., Ltd.) to obtain toner base particle 3. Toner base particle 3 was used as toner particle 3.

Toner particle 3 had a number-average particle diameter (D1) of 6.2 μm, a weight-average particle diameter (D4) of 6.7 μm, an average circularity of 0.940, and a volume resistivity of $1.3\times10^{13}$ (Ω·m).

Toner Particles 4 to 11 Production Example

Toner particles 4 to 11 were obtained by production using the same methods as in the Toner Base Particle Dispersion 1 Production Example and Toner Particle 1 Production, but changing the number of parts of addition of the styrene, n-butyl acrylate, acrylic acid, HNP9 release agent (melting point=76° C., Nippon Seiro Co., Ltd.), and plasticizer in preparation of polymerizable monomer composition to those given in Table 2.

In the table, plasticizer 1 refers to ethylene glycol distearate and plasticizer 2 refers to behenyl behenate.

TABLE 2

| Toner particle No. | Preparation of polymerizable monomer composition: Styrene in colorant dispersion (parts) | Styrene (parts) | n-butyl acrylate (parts) | Acrylic acid (parts) | Release agent (parts) | Plasticizer: Type | Plasticizer: Number of parts (parts) | Volume resistivity (Ω · m) |
|---|---|---|---|---|---|---|---|---|
| 1 | 60.0 | 15.0 | 25.0 | 0.0 | 5.0 | Plasticizer 1 | 15.0 | $3.5 \times 10^{13}$ |
| 4 | 60.0 | 8.0 | 32.0 | 0.0 | 5.0 | Plasticizer 1 | 15.0 | $3.4 \times 10^{13}$ |
| 5 | 60.0 | 21.5 | 17.2 | 1.3 | 5.0 | Plasticizer 1 | 15.0 | $4.0 \times 10^{13}$ |
| 6 | 60.0 | 18.0 | 22.0 | 0.0 | 5.0 | Plasticizer 1 | 20.0 | $2.5 \times 10^{13}$ |
| 7 | 60.0 | 20.0 | 20.0 | 0.0 | 5.0 | Plasticizer 1 | 12.0 | $4.2 \times 10^{13}$ |
| 8 | 60.0 | 13.0 | 27.0 | 0.0 | 5.0 | Plasticizer 1 | 20.0 | $2.4 \times 10^{13}$ |
| 9 | 60.0 | 15.0 | 25.0 | 0.0 | 5.0 | Plasticizer 1 | 30.0 | $2.2 \times 10^{13}$ |
| 10 | 60.0 | 29.5 | 9.2 | 1.3 | 5.0 | Plasticizer 2 | 7.0 | $3.5 \times 10^{13}$ |
| 11 | 60.0 | 5.0 | 35.0 | 0.0 | 5.0 | Plasticizer 1 | 30.0 | $2.0 \times 10^{13}$ |

Toner 1 Production Example

| | |
|---|---|
| toner particle | 1100.0 parts |
| fine particle B1-1 | 2.0 parts |

These materials were introduced into a Supermixer Piccolo SMP-2 (Kawata Mfg. Co., Ltd.) and mixing for 5 minutes at 3,000 rpm was performed while heating the compartment interior to 45° C. by introducing hot water at 45° C. into the jacket.

| | |
|---|---|
| metal compound fine particle A-1 | 6.0 parts |
| hydrophobic silica fine particles | 2.0 parts |

These materials were then introduced into the Supermixer Piccolo SMP-2 (Kawata Mfg. Co., Ltd.) and mixing for 10 minutes at 3,000 rpm was performed while maintaining the compartment interior at 20° C. by introducing cold water at 20° C. into the jacket. This was followed by sieving with a mesh having an aperture of 150 μm to obtain toner 1. The property values of toner 1 are given in Tables 4 and 5.

Toners 2 to 15 and 19 to 22 Production Example

Toners 2 to 15 and 19 to 22 were obtained proceeding as in the Toner 1 Production Example, but changing the type and amount of addition of the toner particle, metal compound fine particle A, and fine particle B1 as indicated in Table 3.

The step of mixing while heating to 45° C. was not carried out in those examples that lacked fine particle B1. The property values of toners 2 to 15 and 19 to 22 are given in Tables 4 and 5.

TABLE 3

| Toner No. | Toner particle No. | Metal compound fine particle A: Designation | Metal compound fine particle A: Amount of addition | Fine particle B1: Designation | Fine particle B1: Amount of addition | Hydrophobic silica fine particle Amount of addition |
|---|---|---|---|---|---|---|
| 1 | 1 | A-1 | 6.0 | B1-1 | 2.0 | 2.0 |
| 2 | 2 | A-1 | 6.0 | B1-1 | 2.0 | 2.0 |
| 3 | 3 | A-1 | 6.0 | B1-1 | 2.0 | 2.0 |

TABLE 3-continued

| Toner No. | Toner particle No. | Metal compound fine particle A: Designation | Metal compound fine particle A: Amount of addition | Fine particle B1: Designation | Fine particle B1: Amount of addition | Hydrophobic silica fine particle Amount of addition |
|---|---|---|---|---|---|---|
| 4 | 4 | A-1 | 6.0 | B1-1 | 2.0 | 2.0 |
| 5 | 5 | A-1 | 6.0 | B1-1 | 2.0 | 2.0 |
| 6 | 6 | A-1 | 6.0 | B1-1 | 2.0 | 2.0 |
| 7 | 7 | A-1 | 6.0 | B1-1 | 2.0 | 2.0 |
| 8 | 8 | A-1 | 6.0 | B1-1 | 2.0 | 2.0 |
| 9 | 9 | A-1 | 6.0 | B1-1 | 2.0 | 2.0 |
| 10 | 4 | A-1 | 4.0 | B1-1 | 2.0 | 2.0 |
| 11 | 5 | A-1 | 8.0 | B1-1 | 2.0 | 2.0 |
| 12 | 1 | A-2 | 2.0 | B1-1 | 2.0 | 2.0 |
| 13 | 1 | A-4 | 4.0 | B1-1 | 2.0 | 2.0 |
| 14 | 1 | A-3 | 4.0 | B1-1 | 2.0 | 2.0 |
| 15 | 1 | A-1 | 6.0 | B1-2 | 2.0 | 2.0 |
| 16 | 12 | | | No external addition | | |
| 17 | 13 | | | No external addition | | |
| 18 | 14 | A-4 | 4.0 | None | — | None |
| 19 | 10 | A-1 | 10.0 | B1-1 | 2.0 | 2.0 |
| 20 | 11 | A-1 | 6.0 | B1-1 | 2.0 | 2.0 |
| 21 | 1 | A-2 | 4.0 | None | — | 2.0 |
| 22 | 1 | A-1 | 2.0 | B1-1 | 2.0 | 2.0 |
| 23 | 15 | | | No external addition | | |
| 24 | 1 | | | Described in text | | |

Toner 16 Production Example

Protruded Portion B2 Formation Step

The following samples were weighed into a reactor and mixed using a propeller impeller.

| | |
|---|---|
| toner base particle dispersion 1 | 500.0 parts |
| organosilicon compound solution | 35.0 parts |

The pH of the resulting mixture was then adjusted to 6.0 using a 1 mol/L aqueous NaOH solution and the temperature of the mixture was brought to 50° C. and holding was subsequently carried out for 1.0 hour while mixing using a propeller impeller (protrusion formation step 1). The pH of the mixture was subsequently adjusted to 9.5 using a 1 mol/L aqueous NaOH solution and holding was carried out for 1.0 hour (protrusion formation step 2).

Polyhydric Acid Metal Salt Attachment Step

| | |
|---|---|
| 44% aqueous titanium lactate solution (TC-310, Matsumoto Fine Chemical Co., Ltd.) | 3.2 parts (corresponds to 1.4 parts as titanium lactate) |
| organosilicon compound solution | 10.0 parts |

These samples were then weighed out and mixed in the reactor; the pH of the obtained mixture was subsequently adjusted to 9.5 using a 1 mol/L aqueous NaOH solution; and holding was carried out for 4.0 hours. After dropping the temperature to 25° C., the pH was adjusted to 1.5 using 1 mol/L hydrochloric acid; stirring was performed for 1.0 hour; and filtration was subsequently carried out while washing with deionized water to obtain toner particle 12.

Upon observation of toner particle 12 by STEM-EDS, protruded portions containing an organosilicon polymer and polyhydric acid metal salt fine particles were observed at the toner base particle surface and the presence of titanium at the protruded portion surface was confirmed. In addition, an ion derived from a titanium phosphate compound was detected in analysis of toner particle 12 by time-of-flight secondary ion mass spectrometry (TOF-SIMS).

This titanium phosphate compound is the reaction product of the titanium lactate with phosphate ion deriving from the sodium phosphate or calcium phosphate in the toner base particle dispersion 1.

The thusly obtained toner particle 12 was used as toner 16. The property values for toner 16 are given in Tables 4 and 5.

An organosilicon polymer corresponding to the protruded portion B2 in this production example was obtained by using the phosphate salt-containing aqueous medium instead of the toner base particle dispersion 1 in this production example and carrying out up to and including the protrusion formation step 2. The volume resistivity of this organosilicon polymer was $5.0 \times 10^{12}$ ($\Omega \cdot m$). This volume resistivity was used as the volume resistivity of the protruded portion B2. In addition, a metal compound fine particle corresponding to the metal compound fine particle A in this production example was obtained proceeding as in the toner particle 12 production example, but without adding the organosilicon compound solution and using the phosphate salt-containing aqueous medium instead of the toner base particle dispersion 1 in this production example. The volume resistivity of this metal compound fine particle was $9.8 \times 10^{4}$ ($\Omega \cdot m$). This volume resistivity was used as the volume resistivity of the metal compound fine particle A.

Toner 17 Production Example

Toner particle 13 was obtained proceeding as in the Toner Particle 16 Production Example, but using 12.0 parts of ammonium zirconium lactate (ZC-300, Matsumoto Fine Chemical Co., Ltd.) (corresponds to 1.4 parts as ammonium zirconium lactate) instead of the 3.2 parts of the 44% aqueous titanium lactate solution (TC-310, Matsumoto Fine Chemical Co., Ltd.).

Upon observation of toner particle 13 by STEM-EDS, protruded portions containing an organosilicon polymer and polyhydric acid metal salt fine particles were observed at the toner base particle surface and the presence of zirconium at the protruded portion surface was confirmed. In addition, an ion derived from a zirconium phosphate compound was detected in analysis of toner particle 13 by time-of-flight secondary ion mass spectrometry (TOF-SIMS).

This zirconium phosphate compound is the reaction product of the ammonium zirconium lactate with phosphate ion deriving from the sodium phosphate or calcium phosphate in the toner base particle dispersion 1.

The thusly obtained toner particle 13 was used as toner 17. The property values for toner 17 are given in Tables 4 and 5.

An organosilicon polymer corresponding to the protruded portion B2 in this production example was obtained by using the phosphate salt-containing aqueous medium instead of the toner base particle dispersion 1 in this production example and carrying out up to and including the protrusion formation step 2. The volume resistivity of this organosilicon polymer was $5.0 \times 10^{12}$ ($\Omega \cdot m$). This volume resistivity was used as the volume resistivity of the protruded portion B2. In addition, a metal compound fine particle corresponding to the metal compound fine particle A in this production example was obtained proceeding as in the toner particle 13 production example, but without adding the organosilicon compound solution and using the phosphate salt-containing aqueous medium instead of the toner base particle dispersion 1 in this production example. The volume resistivity of this metal compound fine particle was $1.2 \times 10^{5}$ ($\Omega \cdot m$). This volume resistivity was used as the volume resistivity of the metal compound fine particle A.

Toner 18 Production Example

Toner particle 14 was obtained proceeding as in the Toner 16 Production Example, but without using the 44% aqueous titanium lactate solution (TC-310, Matsumoto Fine Chemical Co., Ltd.).

| | |
|---|---|
| toner particle 14 | 100.0 parts |
| metal compound fine particle A-4 | 4.0 parts |

These materials were introduced into a Supermixer Piccolo SMP-2 (Kawata Mfg. Co., Ltd.) and mixing was performed for 10 minutes at 3,000 rpm. This was followed by sieving on a mesh with an aperture of 150 μm to obtain toner 18. The property values for toner 18 are given in Tables 4 and 5.

An organosilicon polymer corresponding to the protruded portion B2 in this production example was obtained by using the phosphate salt-containing aqueous medium instead of the toner base particle dispersion 1 in this production example. The volume resistivity of this organosilicon polymer was $5.0 \times 10^{12}$ ($\Omega \cdot m$). This volume resistivity was used as the volume resistivity of the protruded portion B2.

Toner 23 Production Example

The following samples were weighed into a reactor and mixed using a propeller impeller.

| | |
|---|---|
| organosilicon compound solution 1 | 30.0 parts |
| aluminum oxide fine particles 3.0 parts (number-average particle diameter = 15 nm, volume resistivity = $2.4 \times 10^{4}$ $\Omega \cdot m$) | |
| silica fine particles (produced by the water glass method, number-average particle diameter = 80 nm, volume resistivity = $1.0 \times 10^{12}$ $\Omega \cdot m$) | 3.0 parts |
| toner base particle dispersion 1 | 500.0 parts |

Then, while mixing using a propeller impeller, the pH of the mixture was adjusted to 5.5 and the temperature was then raised to 70° C. and holding was carried out for 3.0 hours. The pH was subsequently adjusted to 9.5 using a 1.0 mol/L aqueous NaOH solution and holding was carried out for 2.0 hours while stirring. The pH was adjusted to 1.5 using 10% hydrochloric acid and stirring was carried out for 1.0 hour, followed by filtration while washing with deionized water to obtain toner particle 15.

The following was confirmed upon STEM-EDS observation of toner particle 15: protruded portions B2 were formed on the toner base particle surface due to the embedding in the toner base particle of organosilicon polymer-coated silica particles; aluminum was present at the surface of these protruded portions B2.

Ion derived from polyhydric acid metal salt was not detected when toner particle 15 was analyzed by time-of-flight secondary ion mass spectrometry (TOF-SIMS).

The thusly obtained toner particle 15 was used as toner 23. The property values for toner 23 are given in Tables 4 and 5.

Organosilicon polymer-coated silica fine particles corresponding to the protruded portion B2 in this production example were obtained proceeding as in this production example, but without adding the aluminum oxide fine particles and using the phosphate salt-containing aqueous medium instead of the toner base particle dispersion 1. The volume resistivity of these silica fine particles was $1.0\times10^{12}$ ($\Omega\cdot m$). This volume resistivity was used as the volume resistivity of the protruded portion B2. In addition, organosilicon polymer-coated metal compound fine particles corresponding to the metal compound fine particle A in this production example were obtained proceeding as in this production example, but without adding the silica fine particles and using the phosphate salt-containing aqueous medium instead of the toner base particle dispersion 1. The volume resistivity of this metal compound fine particle was $3.2\times10^{7}$ ($\Omega\cdot m$). This volume resistivity was used as the volume resistivity of the metal compound fine particle A.

Toner 24 Production Example

| | |
|---|---|
| toner particle 1 | 100.0 parts |
| ITO fine particles (number-average particle diameter = 30 nm) | 15.0 parts |

These materials were introduced into a Supermixer Piccolo SMP-2 (Kawata Mfg. Co., Ltd.) and mixing was performed for 30 seconds at 3,000 rpm.

| | |
|---|---|
| This was followed by sieving on a mesh with an aperture of 150 μm to obtain a conductive powder (volume resistivity = $10^2$ $\Omega\cdot m$). | |
| conductive powder | 100.0 parts |
| styrene-acrylic resin particles (number-average particle diameter = 1,000 nm) | 20.0 parts |

These materials were introduced into a Supermixer Piccolo SMP-2 (Kawata Mfg. Co., Ltd.) and mixing was performed for 30 seconds at 3,000 rpm. This was followed by sieving on a mesh with an aperture of 150 μm to obtain toner 24. The property values for toner 24 are given in Tables 4 and 5.

Indium tin oxide (Sigma-Aldrich) was used for the aforementioned ITO fine particles.

TABLE 4

| | Dielectric loss tangent of toner | | | Thermal characteristics | | | | | | Metal compound fine particle A | |
|---|---|---|---|---|---|---|---|---|---|---|---|
| Toner No. | tanδ 50° C.(1) | tanδ 30° C.(2)/ tanδ 50° C.(1) | tanδ 30° C.(1)/ tanδ 30° C.(2) | Tg (° C.) | Ta (° C.) | Average circularity | D1 (μm) | D4 (μm) | DA (nm) | Percentage occurrence of metal element (atomic %) | Classification |
| 1 | 0.025 | 0.40 | 1.00 | 55 | 80 | 0.985 | 6.2 | 6.7 | 33 | 6.5% | Metal oxide |
| 2 | 0.025 | 0.40 | 1.00 | 55 | 80 | 0.955 | 6.2 | 6.7 | 33 | 6.4% | Metal oxide |
| 3 | 0.025 | 0.40 | 1.00 | 55 | 80 | 0.940 | 6.2 | 6.7 | 33 | 6.2% | Metal oxide |
| 4 | 0.036 | 0.40 | 0.80 | 40 | 60 | 0.985 | 6.2 | 6.7 | 33 | 6.5% | Metal oxide |
| 5 | 0.020 | 0.60 | 1.10 | 70 | 90 | 0.985 | 6.2 | 6.7 | 33 | 6.5% | Metal oxide |
| 6 | 0.024 | 0.40 | 1.00 | 60 | 80 | 0.985 | 6.2 | 6.7 | 33 | 6.5% | Metal oxide |
| 7 | 0.022 | 0.40 | 1.00 | 65 | 85 | 0.985 | 6.2 | 6.7 | 33 | 6.5% | Metal oxide |
| 8 | 0.030 | 0.40 | 1.00 | 50 | 70 | 0.985 | 6.2 | 6.7 | 33 | 6.5% | Metal oxide |
| 9 | 0.030 | 0.40 | 1.00 | 55 | 60 | 0.985 | 6.2 | 6.7 | 33 | 6.5% | Metal oxide |
| 10 | 0.015 | 0.50 | 0.75 | 40 | 60 | 0.985 | 6.2 | 6.7 | 33 | 4.3% | Metal oxide |
| 11 | 0.050 | 0.60 | 1.20 | 70 | 90 | 0.985 | 6.2 | 6.7 | 33 | 8.9% | Metal oxide |
| 12 | 0.025 | 0.35 | 1.00 | 55 | 80 | 0.985 | 6.2 | 6.7 | 6 | 5.8% | Metal oxide |
| 13 | 0.036 | 0.30 | 1.00 | 55 | 80 | 0.985 | 6.2 | 6.7 | 22 | 6.3% | Polyhydric acid metal salt |
| 14 | 0.018 | 0.45 | 1.00 | 55 | 80 | 0.985 | 6.2 | 6.7 | 15 | 6.1% | Metal oxide |
| 15 | 0.032 | 0.45 | 1.00 | 55 | 80 | 0.985 | 6.2 | 6.7 | 33 | 6.5% | Metal oxide |
| 16 | 0.036 | 0.30 | 1.00 | 55 | 80 | 0.985 | 6.2 | 6.7 | 15 | 3.2% | Polyhydric acid metal salt |
| 17 | 0.036 | 0.30 | 1.00 | 55 | 80 | 0.985 | 6.2 | 6.7 | 22 | 3.1% | Polyhydric acid metal salt |
| 18 | 0.040 | 0.30 | 1.00 | 55 | 80 | 0.985 | 6.2 | 6.7 | 22 | 6.3% | Polyhydric acid metal salt |
| 19 | 0.050 | 0.75 | 1.00 | 75 | 95 | 0.985 | 6.2 | 6.7 | 33 | 10.8% | Metal oxide |
| 20 | Not measurable (due to low Tg and Ta) | | | 35 | 55 | 0.985 | 6.2 | 6.7 | 33 | 6.5% | Metal oxide |

TABLE 4-continued

| Toner No. | Dielectric loss tangent of toner tanδ 50° C.(1) | tanδ 30° C.(2)/ tanδ 50° C.(1) | tanδ 30° C.(1)/ tanδ 30° C.(2) | Thermal characteristics Tg (° C.) | Ta (° C.) | Average circularity | D1 (μm) | D4 (μm) | Metal compound fine particle A DA (nm) | Percentage occurrence of metal element (atomic %) | Classification |
|---|---|---|---|---|---|---|---|---|---|---|---|
| 21 | 0.060 | 0.35 | 1.00 | 55 | 80 | 0.985 | 6.2 | 6.7 | 6 | 11.6% | Metal oxide |
| 22 | 0.012 | 0.40 | 1.00 | 55 | 80 | 0.985 | 6.2 | 6.7 | 33 | 2.3% | Metal oxide |
| 23 | 0.006 | 0.40 | 1.00 | 55 | 80 | 0.985 | 6.2 | 6.7 | 15 | 2.6% | Metal oxide |
| 24 | 0.120 | 1.00 | 1.00 | 55 | 80 | 0.985 | 6.2 | 6.7 | 30 | 22.0% | Metal oxide |

TABLE 5

| Toner No. | Fine particle B1 DB (nm) | Coverage ratio (%) | Classification | Protruded portion B2 Number-average value of H (nm) | Coverage ratio (%) | Classification |
|---|---|---|---|---|---|---|
| 1 | 100 | 20% | Silica | — | — | — |
| 2 | 100 | 20% | Silica | — | — | — |
| 3 | 100 | 20% | Silica | — | — | — |
| 4 | 100 | 20% | Silica | — | — | — |
| 5 | 100 | 20% | Silica | — | — | — |
| 6 | 100 | 20% | Silica | — | — | — |
| 7 | 100 | 20% | Silica | — | — | — |
| 8 | 100 | 20% | Silica | — | — | — |
| 9 | 100 | 20% | Silica | — | — | — |
| 10 | 100 | 20% | Silica | — | — | — |
| 11 | 100 | 20% | Silica | — | — | — |
| 12 | 100 | 20% | Silica | — | — | — |
| 13 | 100 | 20% | Silica | — | — | — |
| 14 | 100 | 20% | Silica | — | — | — |
| 15 | 100 | 20% | Organosilicon polymer | — | — | — |
| 16 | — | — | — | 60 | 60% | Organosilicon polymer |
| 17 | — | — | — | 60 | 60% | Organosilicon polymer |
| 18 | — | — | — | 60 | 60% | Organosilicon polymer |
| 19 | 100 | 20% | Silica | — | — | — |
| 20 | 100 | 20% | Silica | — | — | — |
| 21 | — | — | — | — | — | — |
| 22 | 100 | 20% | Silica | | | |
| 23 | — | — | — | 60 | 20% | Organosilicon polymer |
| 24 | — | — | — | — | — | — |

Examples 1 to 18 and Comparative Examples 1 to 6

Evaluations in the combinations shown in Table 6 were performed using toners 1 to 24. The results of the evaluations are given in Table 6.

The evaluation methods and evaluation criteria are described in the following.

A modified version of an LBP-712Ci (Canon, Inc.) commercial laser printer was used as the image-forming apparatus.

The modifications were as follows: through connection to an external high-voltage power source, any potential difference could be established between the charging blade and charging roller, and the process speed was set to 298 mm/sec.

A commercial 040H (cyan) toner cartridge (Canon, Inc.) was used as the process cartridge. The product toner was removed from the interior of the cartridge; cleaning with an air blower was performed; and 100 g of a toner as described above was loaded.

The product toner was removed at each of the yellow, magenta, and black stations, and the evaluations were performed with the yellow, magenta, and black cartridges installed, but with the remaining toner amount detection mechanism inactivated.

Evaluation of Charge Injection Capability (Injected Charge Quantity) and Injected Charge Quantity Distribution The aforementioned process cartridge and modified laser printer and the evaluation paper (GF-0081 (Canon, Inc.), A4, 81.4 g/$m^2$) were held for 48 hours in a normal-temperature, normal-humidity environment (23° C./50% RH, referred to in the following as the NN environment).

The potential difference between the charging blade and charging roller was first set to 0 V and an all-white image was output. The machine was stopped during image formation and the process cartridge was removed from the unit and the charge quantity and charge quantity distribution were evaluated on the toner on the developing roller using an E-spart Analyzer Model EST-1 charge quantity distribution analyzer (Hosokawa Micron Corporation).

The potential difference between the charging blade and charging roller was then set to −400 V and the same evaluation was performed.

The injected charge quantity and the injected charge quantity distribution were evaluated from the change in the charge quantity ΔQ/M (unit: μC/g) and the change in the charge quantity distribution between the potential difference of 0 V and the potential difference of −400 V. The toners according to the present invention exhibited negative charging, but the absolute values are given in Table 6 below.

With regard to the charge quantity distribution, the full width at half maximum of the charge quantity distribution at −400 V was compared with the full width at half maximum of the charge quantity distribution at 0 V, and the resulting "times" multiplier was used as the evaluation criterion.

With this criterion, a smaller value of the "times" multiplier indicates a sharper charge quantity distribution and a better state of charging.

In this evaluation, a higher charge injection capability results in a greater change in the charge quantity as a function of the potential difference and due to this a larger charge quantity difference (ΔQ/M). A uniform charge quantity distribution, which is one of the favorable characteristics of injection charging, can be obtained at the same time.

In this evaluation, the temperature at between the toner carrying member and the controlling member was confirmed to be 50° C., and the temperature on the intermediate transfer belt was confirmed to be 30° C.

Evaluation of Charge Retention Capability

Using the same conditions as in the evaluation of the charge injection capability, the potential difference between the charging blade and charging roller was set to −400 V and an all-black image was output. The machine was stopped during image formation and the process cartridge was removed from the unit and the charge quantity on the toner on the photosensitive drum was evaluated using a charge quantity distribution analyzer (E-spart Analyzer Model EST-1, Hosokawa Micron Corporation).

The charge retention capability was evaluated by comparing the charge quantity on the developing roller in the aforementioned evaluation of the charge injection capability with the charge quantity on the photosensitive drum in this evaluation.

In this evaluation, a higher charge retention capability indicates a greater difficulty for charge leakage to occur in the developing step and as a consequence a higher charge quantity is retained. That is, a smaller numerical value indicates a better charge retention capability.

Durability (Change in Charge Quantity Pre-Versus-Post-Durability Testing)

After the aforementioned evaluation of the injected charge quantity and injected charge quantity distribution, the process speed was changed to 218 mm/sec and the potential difference between the charging blade and charging roller was set to −200 V. 10,000 prints were continuously output in the N/N environment on the evaluation paper of an image having a print percentage of 0.5%.

After standing for 48 hours in the same environment, the process speed was changed to 298 mm/sec and the potential difference between the charging blade and charging roller was set to −400 V and an all-black image was output.

The machine was stopped during image formation and the process cartridge was removed from the unit and the charge quantity was evaluated on the toner on the photosensitive drum using a charge quantity distribution analyzer (E-spart Analyzer Model EST-1, Hosokawa Micron Corporation).

This evaluation makes it possible to see the effect when the toner particle repeatedly undergoes an elastic microdeformation due to heating and cooling. The charge quantity pre-versus-post-durability testing presents little change for a toner that exhibits an excellent durability and charging performance.

Toner 20 was evaluated as impractical due to the appearance of toner clumps in the developing device when this evaluation was carried out.

TABLE 6

| | | Injected charge quantity | | Injected charge | | |
|---|---|---|---|---|---|---|
| Example No. | Toner No. | Charge quantity at −400 V (μC/g) | ΔQ/M | quantity distribution Ratio of change in full width at half maximum (times) | Charge retention capability Change in charge quantity (μC/g) | Durability Change in charge quantity (μC/g) |
| 1 | 1 | 40 | 22 | 0.71 | 3 | 5 |
| 2 | 2 | 40 | 21 | 0.75 | 5 | 5 |
| 3 | 3 | 41 | 20 | 0.76 | 8 | 6 |
| 4 | 4 | 42 | 21 | 0.76 | 6 | 9 |
| 5 | 5 | 41 | 21 | 0.75 | 9 | 3 |
| 6 | 6 | 40 | 20 | 0.73 | 2 | 5 |
| 7 | 7 | 42 | 21 | 0.77 | 6 | 4 |
| 8 | 8 | 41 | 21 | 0.63 | 2 | 6 |
| 9 | 9 | 42 | 20 | 0.62 | 2 | 5 |
| 10 | 10 | 30 | 9 | 0.78 | 5 | 10 |
| 11 | 11 | 38 | 21 | 0.77 | 10 | 6 |
| 12 | 12 | 41 | 21 | 0.66 | 3 | 5 |
| 13 | 13 | 42 | 22 | 0.58 | 3 | 3 |
| 14 | 14 | 35 | 16 | 0.75 | 5 | 3 |
| 15 | 15 | 43 | 23 | 0.76 | 3 | 5 |
| 16 | 16 | 42 | 22 | 0.55 | 2 | 2 |
| 17 | 17 | 41 | 22 | 0.59 | 2 | 2 |
| 18 | 18 | 42 | 22 | 0.60 | 4 | 4 |

TABLE 6-continued

| | | Injected charge quantity | | Injected charge | | |
|---|---|---|---|---|---|---|
| Example No. | Toner No. | Charge quantity at −400 V (μC/g) | ΔQ/M | quantity distribution Ratio of change in full width at half maximum (times) | Charge retention capability Change in charge quantity (μC/g) | Durability Change in charge quantity (μC/g) |
| C.E. 1 | 19 | 28 | 16 | 0.83 | 15 | 6 |
| C.E. 2 | 20 | | | Not evaluable | | |
| C.E. 3 | 21 | 20 | 15 | 0.85 | 14 | 13 |
| C.E. 4 | 22 | 38 | 4 | 0.81 | 4 | 9 |
| C.E. 5 | 23 | 26 | 2 | 0.93 | 4 | 8 |
| C.E. 6 | 24 | 14 | 5 | 0.90 | 12 | 5 |

In the table: "C.E." denotes "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A toner, comprising:

a toner particle comprising a binder resin, wherein when measuring impedances in accordance with a series of impedance measurements including the steps of:

(i) preparing a first treated sample by leaving the toner under an environment of a temperature of 30° C. and relative humidity of 50% for 20 minutes;

(ii) measuring an impedance of the first treated sample under an environment of a temperature of 30° C. and relative humidity of 50% while varying a frequency from 100 kHz to 0.0215 Hz;

(iii) preparing a second treated sample by leaving the first treated sample for 20 minutes under an environment of a temperature of 50° C. and relative humidity of 50%;

(iv) measuring an impedance of the second treated sample under environment of a temperature of 50° C. and a relative humidity of 50% while varying a frequency from 100 kHz to 0.0215 Hz;

(v) preparing a third treated sample by leaving the second treated sample for 20 minutes under an environment of a temperature of 30° C. and relative humidity of 50%; and (vi) measuring an impedance of the third treated sample under environment of a temperature of 30° C. and a relative humidity of 50% while varying a frequency from 100 kHz to 0.0215 Hz, $0.015 \leq \tan\delta 50° C.(1) \leq 0.050$ and $0.25 \leq \tan\delta 30° C.(2)/\tan\delta 50° C.(1) \leq 0.66$ when tan δ50° C. (1) is a dielectric loss tangent at a frequency of 10 kHz calculated from the impedance measured in step (iv) and tan δ30° C. (2) is a dielectric loss tangent at a frequency of 10 kHz calculated from the impedance measured in step (vi).

2. The toner according to claim 1, having Tg of 40 to 70° C., and Ta of 60 to 90° C., where Ta is a temperature at which G' is $1.0\times10^5$ Pa in dynamic viscoelastic measurement of the toner and Tg is a glass transition temperature of the toner according to differential scanning calorimetric measurement.

3. The toner according to claim 2, wherein Tg is 50 to 60° C., and Ta is 60 to 80° C.

4. The toner according to claim 1, where $0.80 \leq \tan\delta 30° C.(1)/\tan\delta 30° C.(2) \leq 1.20$ when tan δ30° C.(1) is a dielectric loss tangent at a frequency of 10 kHz calculated from the impedance measured in step (ii).

5. The toner according to claim 1, having an average circularity of 0.950 to 0.990.

6. The toner according to claim 1, wherein the toner comprises fine particles on a surface of the toner particle.

7. The toner according to claim 6, wherein the fine particles comprise a metal element-containing compound.

* * * * *